US012564121B2

(12) United States Patent
Hubner et al.

(10) Patent No.: US 12,564,121 B2
(45) Date of Patent: Mar. 3, 2026

(54) IMPLEMENT MOUNTED SENSORS SENSING SURFACE/FURROW CHARACTERISTICS AND CONTROL

(71) Applicants: Deere & Company, Moline, IL (US); Iowa State University Research Foundation, Inc., Ames, IA (US)

(72) Inventors: Cary S. Hubner, Geneseo, IL (US); Matthew J. Darr, Ames, IA (US); Justin Borgstadt, West Des Moines, IA (US); John P. Just, Ames, IA (US)

(73) Assignees: DEERE & COMPANY, Moline, IL (US); Iowa State University Research Foundation, Inc., Moline, IL (US)

( * ) Notice: Subject to any disclaimer, the term of this patent is extended or adjusted under 35 U.S.C. 154(b) by 927 days.

(21) Appl. No.: 16/918,293

(22) Filed: Jul. 1, 2020

(65) Prior Publication Data
US 2022/0000008 A1 Jan. 6, 2022

(51) Int. Cl.
*A01C 5/06* (2006.01)
*A01C 7/20* (2006.01)

(52) U.S. Cl.
CPC .............. *A01C 5/064* (2013.01); *A01C 7/203* (2013.01); *A01C 5/062* (2013.01)

(58) Field of Classification Search
CPC ......... A01C 5/062; A01C 5/064; A01C 7/203; G05D 2201/0201
See application file for complete search history.

(56) References Cited

U.S. PATENT DOCUMENTS

| | | | |
|---|---|---|---|
| 8,365,679 B2 * | 2/2013 | Landphair | G06F 11/30 |
| | | | 701/50 |
| 8,862,339 B2 * | 10/2014 | Henry | A01B 63/28 |
| | | | 701/50 |

(Continued)

FOREIGN PATENT DOCUMENTS

| | | |
|---|---|---|
| AR | 111506 A1 | 7/2019 |
| AU | 2017382800 A1 | 7/2019 |

(Continued)

OTHER PUBLICATIONS

Extended European Search Report and Written Opinion issued in European Patent Application No. 21179499.5, dated Dec. 2, 2021, in 13 pages.

*Primary Examiner* — Alicia Torres
(74) *Attorney, Agent, or Firm* — Christopher J. Volkmann; KELLY, HOLT & CHRISTENSON PLLC

(57) ABSTRACT

A mobile agricultural machine includes a row unit having a furrow opener mounted to the row unit and configured to engage a surface of ground to open a furrow in the ground. A furrow closer is mounted to the row unit behind the furrow opener and configured to engage the surface of the ground to close the furrow. A furrow sensor system is mounted to the row unit and configured to sense characteristics relative to the furrow opened by the furrow opener and generate a sensor signal indicative of the characteristics. The mobile agricultural machine can further include a control system configured to determine a furrow quality metric corresponding to the furrow sensed by the furrow sensor system based on the sensor signal and generate an action signal to control an action of the mobile agricultural machine based on the furrow quality metric.

27 Claims, 16 Drawing Sheets

(56)             References Cited

U.S. PATENT DOCUMENTS

| | | | | |
|---|---|---|---|---|
| 8,909,436 | B2 * | 12/2014 | Achen | A01C 7/205 |
| | | | | 111/164 |
| 8,924,092 | B2 * | 12/2014 | Achen | A01C 21/00 |
| | | | | 701/50 |
| 8,935,986 | B2 * | 1/2015 | Blomme | A01C 5/064 |
| | | | | 111/164 |
| 9,179,595 | B2 * | 11/2015 | Kormann | A01C 5/062 |
| 9,232,687 | B2 | 1/2016 | Bassett | |
| 9,554,504 | B2 * | 1/2017 | Houck | G05D 1/0219 |
| 9,651,536 | B1 * | 5/2017 | Lund | A01C 5/064 |
| 9,693,496 | B2 * | 7/2017 | Tevs | A01C 5/064 |
| 9,743,574 | B1 * | 8/2017 | Maxton | G01N 21/3563 |
| 9,943,027 | B2 * | 4/2018 | Sauder | A01C 7/105 |
| 10,257,973 | B2 * | 4/2019 | Hubner | A01C 5/062 |
| 10,327,374 | B2 * | 6/2019 | Achen | A01B 49/04 |
| 12,256,656 | B2 * | 3/2025 | Strnad | A01C 5/068 |
| 12,369,514 | B2 * | 7/2025 | Strnad | G01B 11/22 |
| 2017/0094894 | A1 * | 4/2017 | Heim | A01C 5/064 |
| 2019/0254223 | A1 * | 8/2019 | Eichhorn | A01B 63/16 |
| 2019/0373801 | A1 * | 12/2019 | Schoeny | A01B 79/005 |
| 2020/0107487 | A1 | 4/2020 | Antich | |
| 2020/0352081 | A1 * | 11/2020 | Arnett | A01B 63/32 |
| 2020/0352088 | A1 * | 11/2020 | Arnett | A01C 7/203 |
| 2022/0142039 | A1 * | 5/2022 | Eichhorn | A01B 63/111 |

FOREIGN PATENT DOCUMENTS

| | | | | | |
|---|---|---|---|---|---|
| CA | 3047779 | A1 * | 6/2018 | | A01C 21/005 |
| EP | 3454634 | A1 | 3/2019 | | |
| WO | WO-0054566 | A2 * | 9/2000 | | A01B 79/005 |
| WO | WO-2014153157 | A1 * | 9/2014 | | A01C 21/00 |
| WO | WO 2016/205421 | A1 | 12/2016 | | |
| WO | WO-2016205422 | A1 * | 12/2016 | | A01B 79/005 |
| WO | WO-2017197292 | A1 * | 11/2017 | | A01B 49/027 |
| WO | WO-2019236990 | A1 * | 12/2019 | | A01B 27/005 |
| WO | WO-2020039322 | A1 * | 2/2020 | | A01B 27/005 |
| WO | 2020231934 | A1 | 11/2020 | | |

* cited by examiner

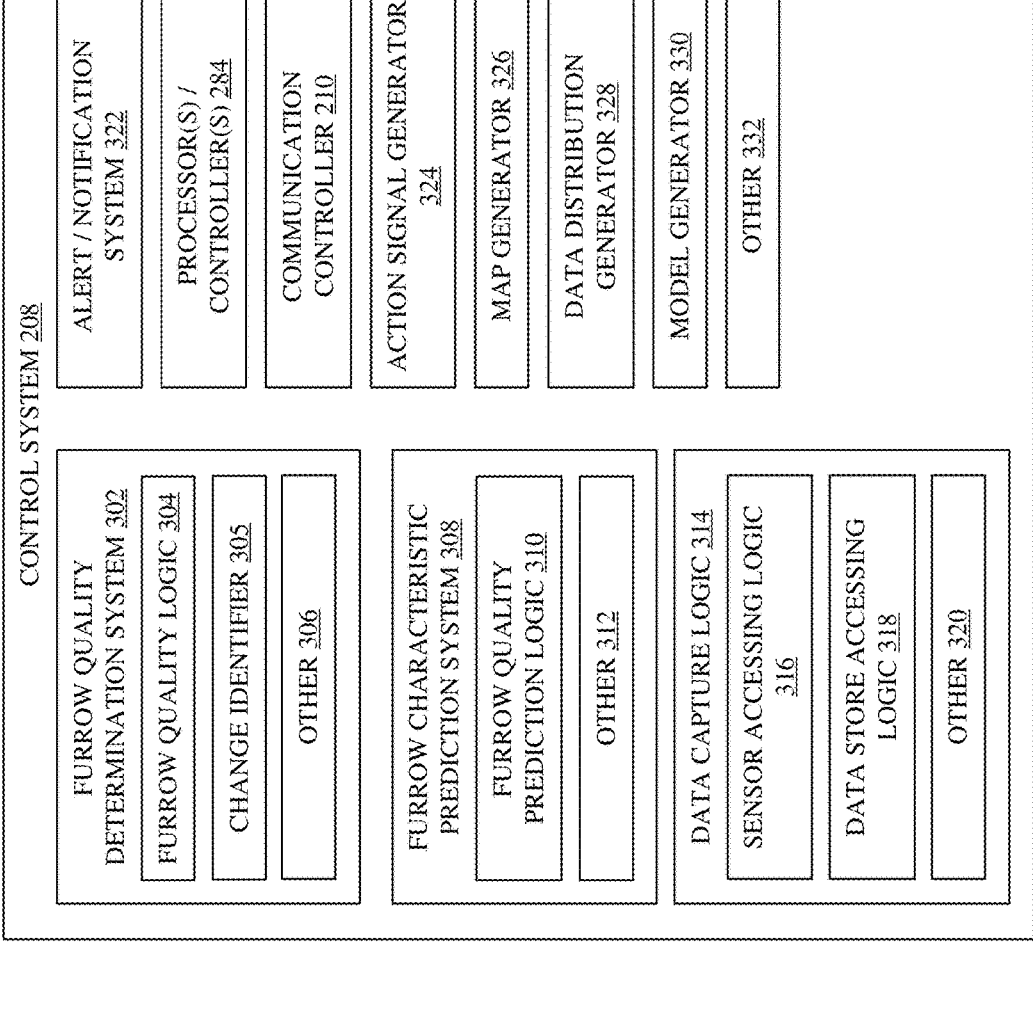

CONTROL SYSTEM 208

ALERT / NOTIFICATION SYSTEM 322

PROCESSOR(S) / CONTROLLER(S) 284

COMMUNICATION CONTROLLER 210

ACTION SIGNAL GENERATOR 324

MAP GENERATOR 326

DATA DISTRIBUTION GENERATOR 328

MODEL GENERATOR 330

OTHER 332

FURROW QUALITY DETERMINATION SYSTEM 302

FURROW QUALITY LOGIC 304

CHANGE IDENTIFIER 305

OTHER 306

FURROW CHARACTERISTIC PREDICTION SYSTEM 308

FURROW QUALITY PREDICTION LOGIC 310

OTHER 312

DATA CAPTURE LOGIC 314

SENSOR ACCESSING LOGIC 316

DATA STORE ACCESSING LOGIC 318

OTHER 320

FIG. 6

IMPLEMENT MOUNTED SENSORS SENSING SURFACE/FURROW CHARACTERISTICS AND CONTROL

FIELD OF THE DESCRIPTION

The present description relates to agricultural machines. More specifically, the present description relates to the control of agricultural machines based on characteristics sensed by a sensor system mounted to the agricultural machine.

BACKGROUND

There are a wide variety of different types of agricultural machines that can be used in a wide variety of agricultural operations. Some of the agricultural machines can include a variety of sensors that sense different characteristics. For example, they can sense characteristics of the agricultural surface upon which the agricultural machines can operate and/or characteristics relative to the operation and perfor- mance of the agricultural machine.

Some agricultural machines include planters that have row units. For instance, a row unit is often mounted on a planter with a plurality of other row units. The planter is often towed by a tractor over soil where seed is planted in the soil, using the row units. The row units on the planter follow the ground profile by using a combination of a downforce assembly, that imparts a downforce on the row unit to push disc openers into the ground to open a furrow, and gauge wheels to set the depth of penetration of the disc openers.

The discussion above is merely provided for general background information and is not intended to be used as an aid in determining the scope of the claimed subject matter.

SUMMARY

A mobile agricultural machine includes a row unit having a furrow opener mounted to the row unit and configured to engage a surface of ground over which the mobile agricul- tural machine travels to open a furrow in the ground. A furrow closer is mounted to the row unit behind the furrow opener relative to a direction of travel of the mobile agri- cultural machine and configured to engage the surface of the ground to close the furrow. A furrow sensor system is mounted to the row unit and configured to sense character- istics relative to the furrow opened by the furrow opener and generate a sensor signal indicative of the characteristics. The mobile agricultural machine can further include a control system configured to determine a furrow quality metric corresponding to the furrow sensed by the furrow sensor system based on the sensor signal and generate an action signal to control an action of the mobile agricultural machine based on the furrow quality metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 is a block diagram of one example of a control system, in more detail.

DETAILED DESCRIPTION

During the performance of various agricultural opera- tions, it can be helpful to have data indicative of character- istics relative to the agricultural surface, the quality of the job being performed, the operation of the agricultural machine, as well as various other data. In the example of planting, for instance, it can be helpful to understand the characteristics and quality of the environment that the seeds are being placed into (e.g., the furrow). Several agronomic factors and machine operation parameters can have an effect on the characteristics and quality of the furrow. Today, an operator/user can rely on manually digging into the soil or on previous experience to understand key factors involved. Additionally, some agricultural machines include sensors which can provide sensor outputs indicative of some of the characteristics and provide them to the operator/user to control the operation of the machine. However, while these systems may be useful in providing some information to the operator, they often do not account for many of the factors that affect the environment into which the seeds are placed and they do not fully indicate the quality of that environ- ment.

Figures 1A, 1B, 1C:
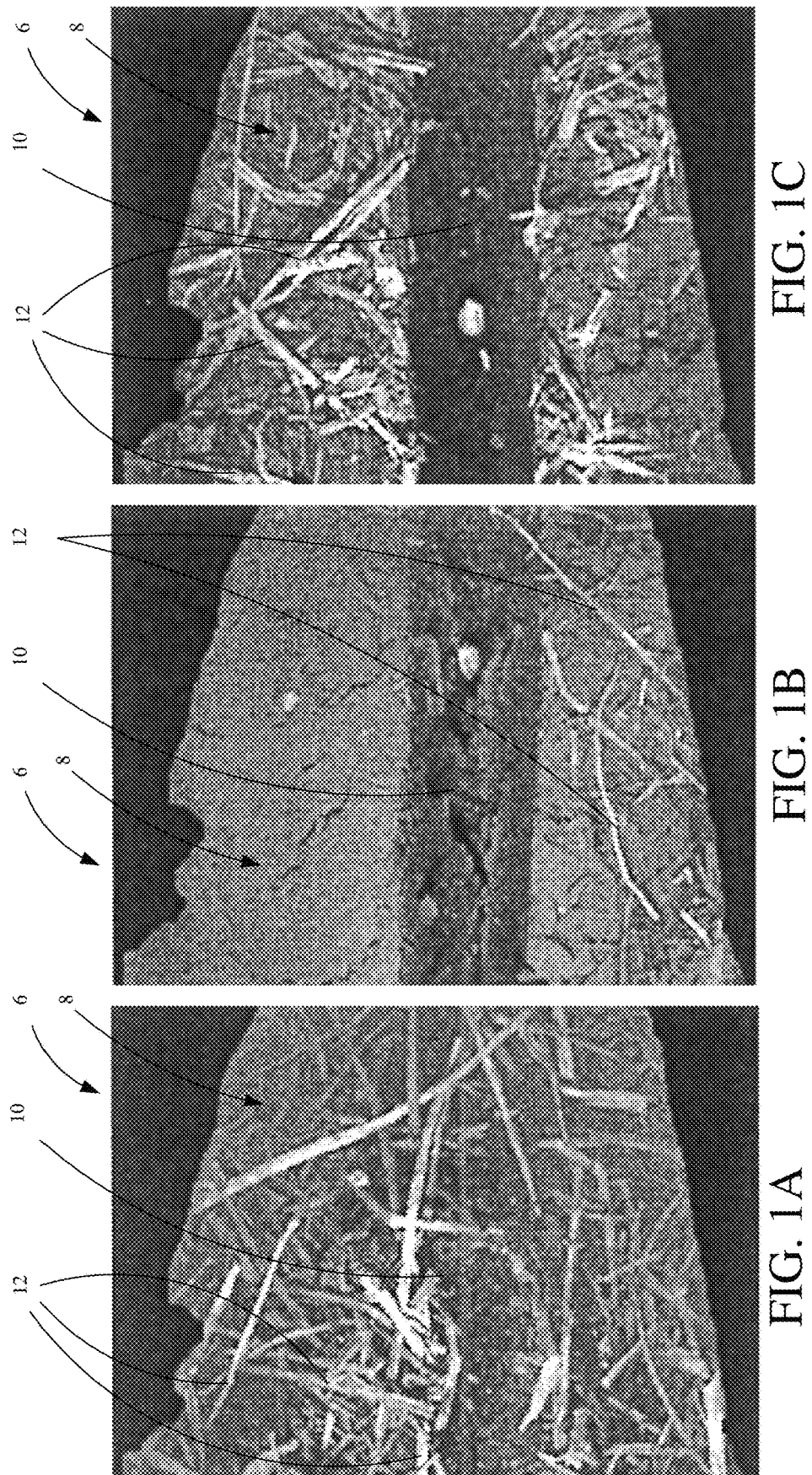
FIGS. 1A-C show example images of an agricultural surface.

For example, a residue sensor can be placed on a row unit to detect residue on the agricultural surface and generate a sensor signal indicative of the level of residue. It is com- monly thought that a quality seed environment (e.g. furrow) is generally free of residue. However, the level of residue is not always indicative of the quality of the furrow and can in fact be orthogonal to the quality of the furrow. By presenting the level of residue as an indication of furrow quality, the operator may control the machine in a way (e.g., increasing/ decreasing the amount of residue cleaning) that does not actually affect the quality of the furrow. On the other hand, by only presenting a singular factor to the operator, or multiple singular factors for that matter, the operator is left to interpret the quality of the furrow based on his or her own experience. This can lead to a delay and/or error in the determination of the quality of the furrow and subsequently lead to a delay and/or error in the control of the machine. FIGS. 1A-C, below, highlight the limitation of current systems.

FIGS. 1A-C show examples of images of agricultural surfaces having been operated on by an agricultural machine. Generally, FIGS. 1A-C show a sensor output (e.g. an image taken by a camera) indicative of the level of residue relative to a furrow opened by a planter. Image 6 includes agricultural surface 8, furrow 10 and residue 12.

As can be seen in FIG. 1A, there is heavy residue and the furrow quality is very low. In FIG. 1B, there is little residue and the furrow quality is high. In FIG. 1C there is heavy residue, but the furrow quality is high. The results of FIGS. 1A and 1B could lead an operator to control the machine to increase the cleaning performed by the agricultural machine to increase the quality of the furrow. But, as FIG. 1C shows, the quality of the furrow is high, even in the presence of residue. Therefore, the level of residue is not always indicative of the quality of the furrow and thus controlling the machine to increase cleaning may not lead to a higher quality furrow.

In some systems, the sensor output may be processed and the data presented to the operator may be in the form of a metric indicative of residue level which can lead to error in the determination of furrow quality and/or the ineffective/ inefficient control of the agricultural machine. Additionally, or in the alternative, if the sensor output were merely presenting the image to the operator, the operator would have to parse through the image to make a determination as to the quality of the furrow, which can lead to error and delay in the control of the agricultural machine. For instance, an operator may choose, based on the residue sensor output, to increase the level of cleaning performed by the agricultural machine which can lead to waste as the level of residue is not always indicative of the quality of the furrow.

Figure 2:
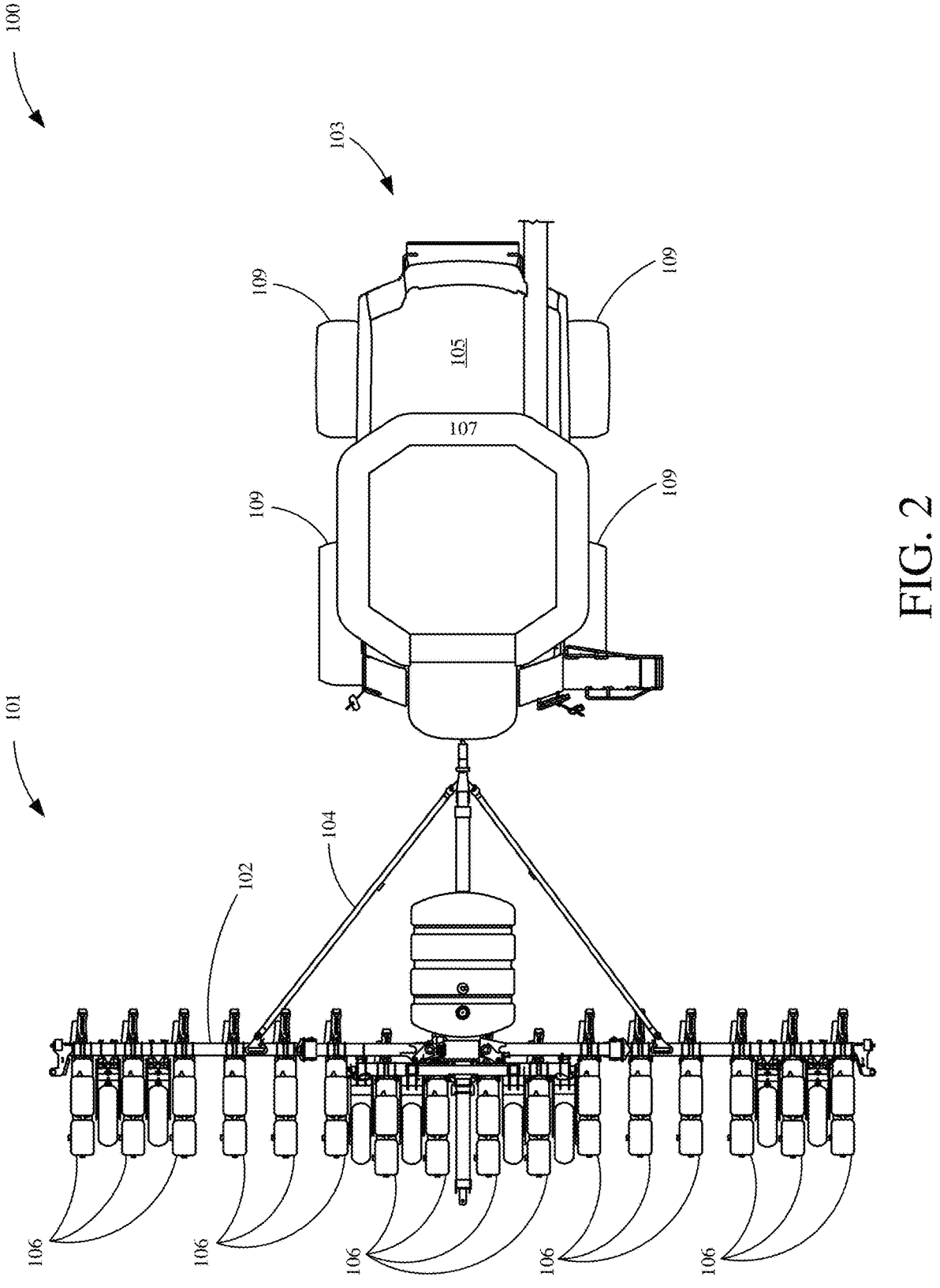
FIG. 2 shows one example of a top view of an agricultural machine.

FIG. 2 is a top view of one example of an agricultural machine 100. Agricultural machine 100 illustratively includes planter 101 and towing vehicle 103. Planter 101 includes a toolbar 102 that is part of a frame 104. FIG. 1 also shows that a plurality of row units 106 are mounted to toolbar 102. Planter 101 can be towed by towing vehicle 103, such as a tractor. Towing vehicle 103 can include a propulsion system, such as an engine, housed in engine compartment 105, ground engaging elements 109, such as wheels or tracks, an operator compartment 107, such as a cab, which can include a number of machine controls, user input mechanisms as well as displays and other user interfaces. Towing vehicle 103 can be linked to planter 101 in a variety of ways, including, but not limited to, mechanically, electrically, hydraulically, pneumatically, etc. Through such linkage, an operator can control vehicle 103 to provide power to planter 101 and/or control the operation of planter 101, from the operator compartment 107 for example.

Figure 3:
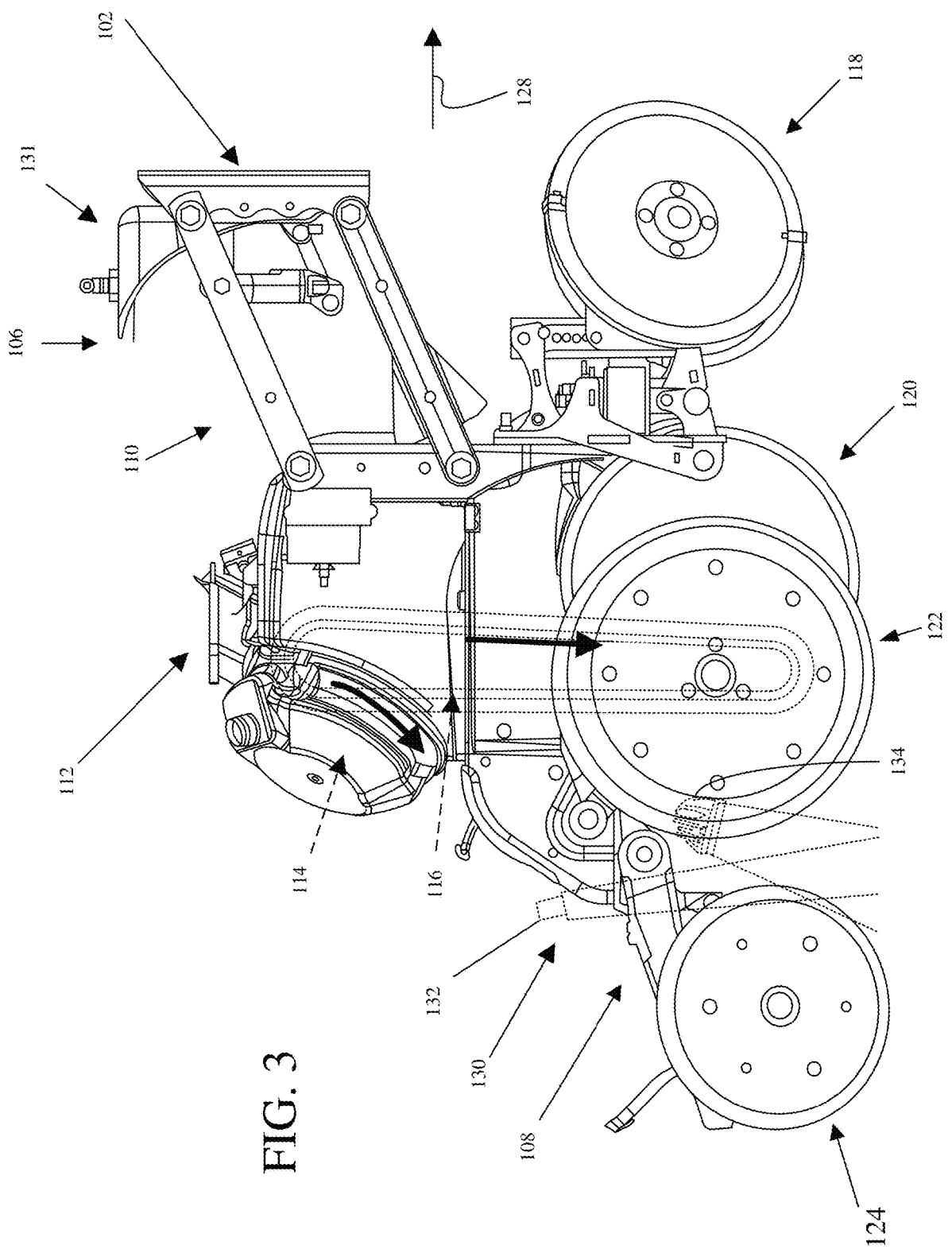
FIG. 3 shows one example of a side view of a row unit of an agricultural machine.

FIG. 3 is a side view showing one example of a row unit 106 in more detail. FIG. 3 shows that each row unit 106 illustratively has a frame 108. Frame 108 is illustratively connected to toolbar 102 by a linkage generally shown at 110. Linkage 110 is illustratively mounted to toolbar 102 so that it can move upwardly and downwardly (relative to toolbar 102).

Row unit 106 also illustratively includes a seed hopper 112 that stores seed. The seed is provided from hopper 112 to a seed metering system 114 that meters the seed and provides the metered seed to a seed delivery system 116 that delivers the seed from the seed metering system 114 to the furrow or trench generated by row unit 106. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, a furrow opener 120, a set of gauge wheels 122, and a set of closing wheels 124. It can also include an additional hopper that can be used to provide additional material, such as fertilizer or another chemical.

In operation, as row unit 106 moves in the direction generally indicated by arrow 128, row cleaner 118 generally cleans the row ahead of the opener 120 to remove debris, such as plant debris from the previous growing season, and the opener 120 opens a furrow in the soil. Gauge wheels 122 illustratively control a depth of the furrow by controlling a depth of engagement that opener 120 has with the soil. Seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil. Though not shown in FIG. 3, row unit 106 can include a substance delivery system that can deliver a variety of substances, such as fertilizer (e.g., liquid fertilizer, granular fertilizer, etc.), to the furrow before it is closed by closing wheels 124.

As shown in FIG. 3, row unit 106 also includes furrow sensing system 130, which illustratively includes furrow sensor 132 and illumination source 134, mounted to frame 108. Sensing system 130 can be pivotally or otherwise adjustably mounted to row unit 106 such that the position and/or orientation of either or both of sensor 132 and illumination source 134 can be adjusted, such as by the operator or automatically by a control system and actuator to, for example, change a point of view of furrow sensor 132, adjust the angle of illumination source 134, etc.

Though shown mounted to row unit 106 between opener 120 and closing wheels 124 it is to be understood that furrow sensing system 130 can be mounted to various locations on row unit 106. Furthermore, additional sensing systems can be mounted to various locations on row unit 106, agricultural machine 100 and/or the towing vehicle. For instance, a first sensor system can be placed in front of opener 120, a second sensor system can be placed as shown in FIG. 3, and a third sensor system can be placed behind closing wheels 124. Additionally, it is to be understood that row unit 106, agricultural machine 100 and/or the towing vehicle can include various other sensors, as will be discussed further below. It is noted that these are just examples, and numerous other arrangements are contemplated herein. Additionally, it should be understood that each row unit 106 on planter 101 can include a respective furrow sensing system 130.

Figure 4:
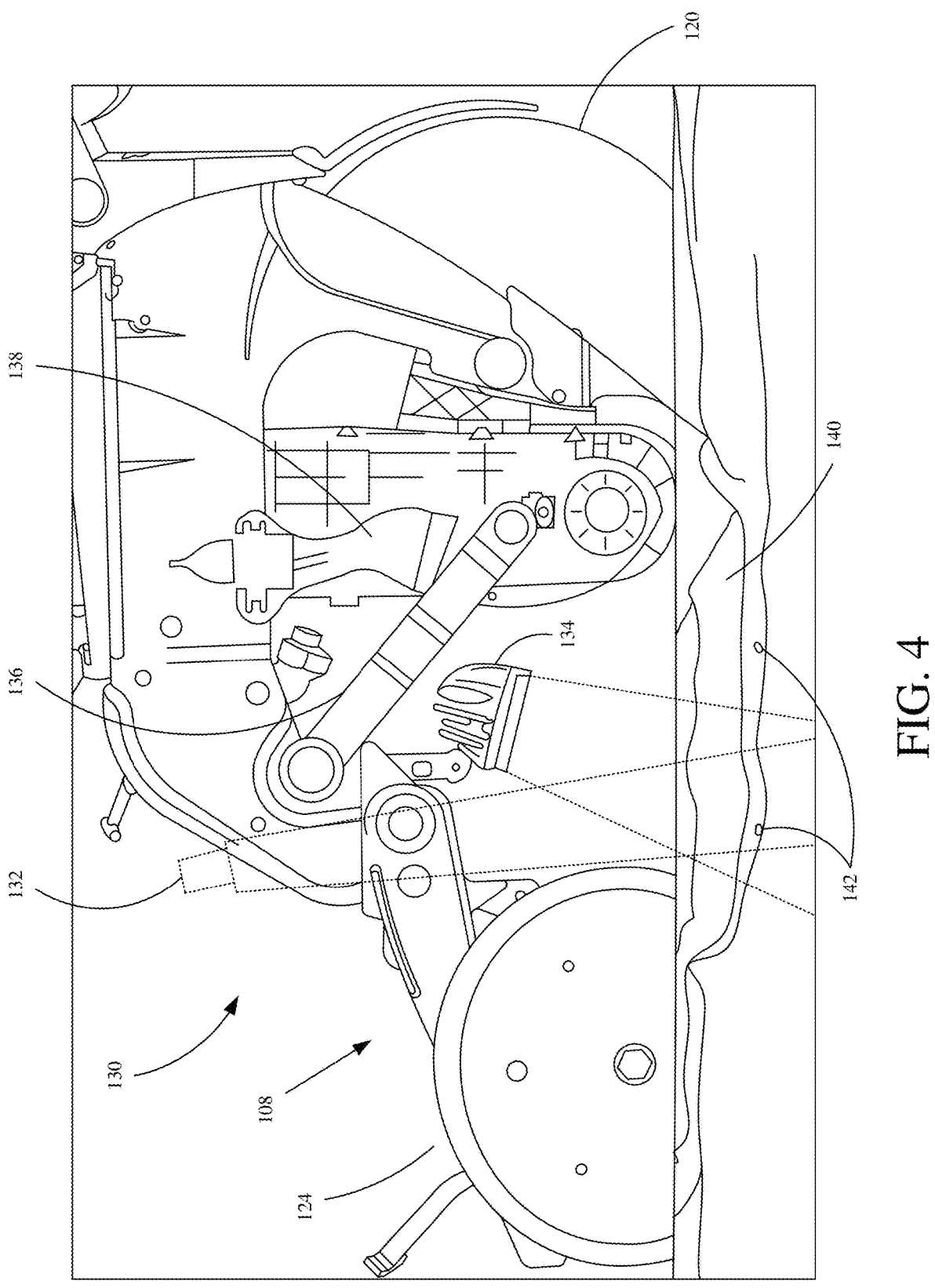
FIG. 4 shows one example of a side view of a furrow sensing system of a row unit on an agricultural machine.

FIG. 4 is a side view showing one example of a furrow sensing system 130 in more detail. In addition to furrow sensing system 130, FIG. 4 has gauge wheel 122 removed to show gauge wheel arm 136, arm contact member 138, furrow 140 and seed(s) 142. As can be seen, as row unit 106 travels over the agricultural surface in the direction of travel as indicated by 128, opener 120 opens furrow 140, into which seed(s) 142 are placed, and soil is placed over seeds 142 by closing wheels 124. Gauge wheel arm 136 is mounted (e.g., pivotally mounted) to frame 108 and gauge wheel 122 (not shown in FIG. 4). The position of gauge wheel arm 136 controls the position of gauge wheel 122 which in turn controls a depth of furrow 140 by controlling a depth of engagement of opener 120 with the agricultural surface (e.g., the depth of engagement into the soil). The position of gauge wheel arm 136 is controlled by the position of arm contact member 138 which can be controlled manually by an operator, and/or automatically, such as by a control system and corresponding actuator.

Sensing system 130 detects a variety of characteristics relative to the furrow 140 and the agricultural surface and generates a sensor signal indicative of those characteristics. Illumination system 134 provides illumination to enhance visibility of furrow 140 by sensor 132. In one example, sensor 132 is an optical sensor, such as an imaging system (e.g., a camera) that captures an image of furrow 140 and the surrounding agricultural surface, though sensor 132 can include any number of other sensors, including other non-contact sensors.

The characteristics detected by sensor 132 can include, but are not limited to, seed depth, furrow depth, soil color, soil moisture, soil composition, seed orientation, seed position, furrow shape, furrow width, seed location, seed count, seed location residue level, residue percentage, seed spacing, seed centering, substance (e.g., fertilizer) application, seed to soil contact, furrow sidewall characteristics (e.g., smearing), furrow compaction, quality of closing furrow (e.g., level of soil coverage of seeds), moisture depth, moisture line relative to seed, seed movement relative to ground, as well as a variety of other characteristics. Additional furrow sensor systems 130 can be placed behind closing wheels 124 and/or in front of opener 120 to, for example, provide closed loop control, detect characteristics relative to the agricultural surface prior to opening of the furrow, detect characteristics relative to the quality of closing of the furrow, as well as a variety of other characteristics.

The sensor signals (e.g., image(s)) of furrow 140 generated by sensor 132 can be processed to extract the various characteristics (e.g., as values), using any number of suitable techniques, including, but not limited to, color modeling (e.g., RGB), edge detection, black/white analysis, machine learning, neural networks, pixel testing, pixel clustering, shape detection, as well as various other techniques. These extracted values can then be used, such as by aggregation or other algorithmic data processing, to determine a metric indicative of job quality (e.g., furrow quality). This metric can be stored and/or displayed in numerous ways to the operator, including in a time history distribution. Additionally, or alternatively, this metric can be used to control the operation of the agricultural machine. The various operations and control of sensor system 130 and the agricultural machine 100 will be discussed in greater detail herein.

Figure 5:
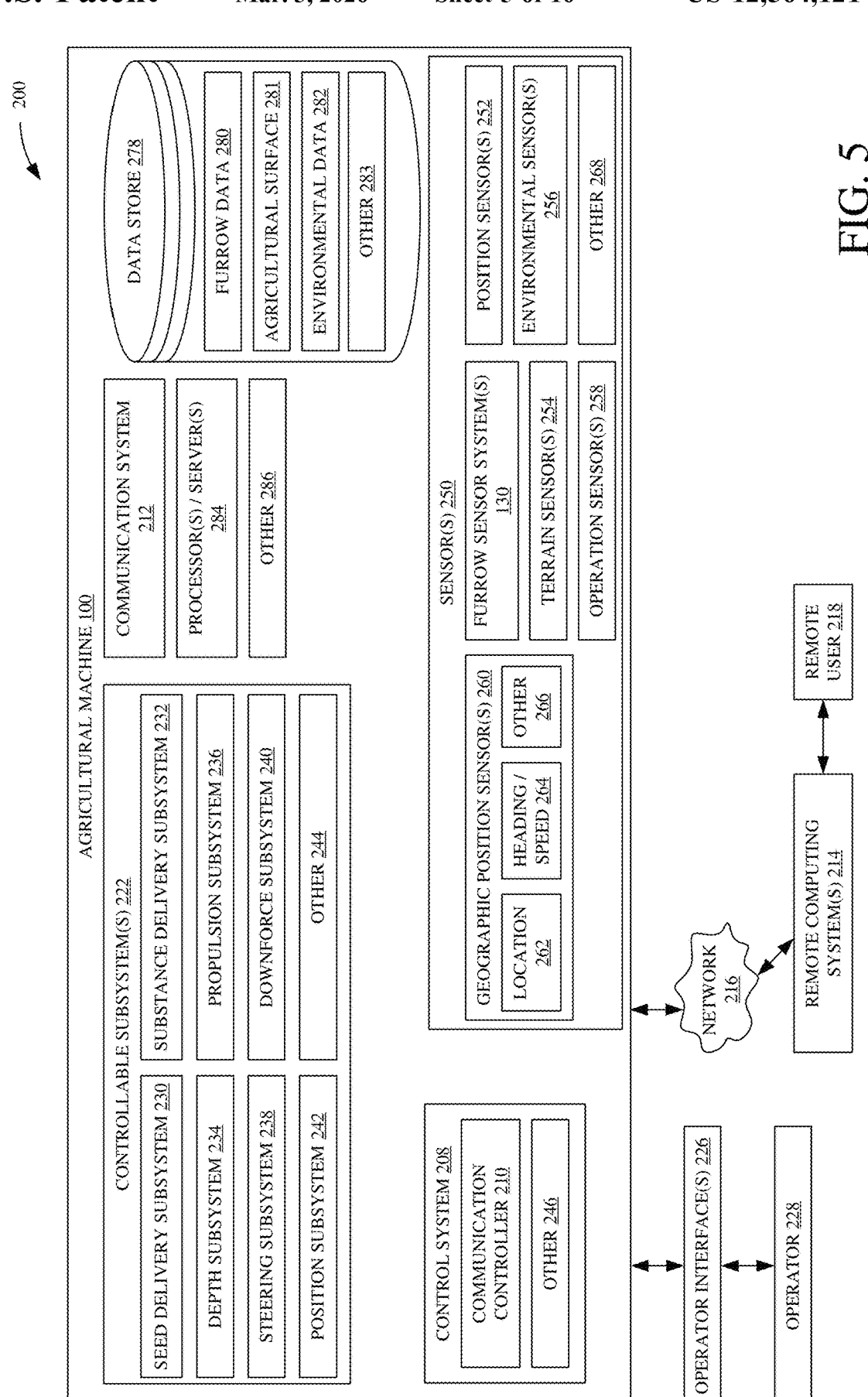
FIG. 5 is a block diagram of one example of an agricul- tural machine architecture.

FIG. 5 is a block diagram of one example of an agricultural machine architecture 200 having an agricultural machine 100 configured to perform a planting operation on an agricultural surface, such as a field. Some items are similar to those shown in previous FIGS. and they are similarly numbered. It will be noted that the items shown on agricultural machine 100 in FIG. 5 can be on planter 101 or towing vehicle 103, or distributed with some items on planter 101 and some on towing vehicle 103, or elsewhere. They are shown together on machine 100 for the sake of example only. The items on agricultural machine 100 can include control system 208, one or more controllable subsystem(s) 222, communication system 212, one or more processor(s) or server(s) 284, data store 278, sensors 250 and it can include other items 286. Control system 208 can include communication controller 210 and other items 246, which can include other controller(s). Controllable subsystem(s) 222 can include seed delivery subsystem 230, substance delivery subsystem 232, depth subsystem 234, propulsion subsystem 236, steering subsystem 238, downforce subsystem 240, position subsystem 242, and other subsystems 244.

FIG. 5 also shows that sensor(s) 250 can include any number of different types of sensors that sense or otherwise detect any number of characteristics. In the illustrated example, sensor(s) 250 include furrow sensor system(s) 130, position sensor(s) 252, terrain sensor(s) 254, environmental sensor(s) 256, operation sensor(s) 258, geographic position sensor(s) 260, and can include other sensor(s) 268 as well.

Control system 208 is configured to control other components and systems of agricultural machine 100. For instance, communication controller 210 is configured to control communication system 212. Communication system 212 is used to communicate between components of agricultural machine 100 and/or with other systems, such as remote computing system(s) 214 over a network 216. Network 216 can be any of a wide variety of different types of networks such as the Internet, a cellular network, a wide area network (WAN), a local area network (LAN), a controller area network (CAN), a near-field communication network, or any of a wide variety of other networks or combinations of networks or communication systems.

A remote user 218 is shown interacting with remote computing system(s) 214. Remote computing system(s) 214 can be a wide variety of different types of systems. For example, remote computing system(s) 214 can be in a remote server environment. Further, it can be a remote computing system (such as a mobile device), a remote network, a farm manager system, a vendor system, or a wide variety of other remote systems. Remote computing system(s) 214 can include one or more processor(s) and/or server(s), a data store, and it can include other items as well.

Before discussing the overall operation of agricultural machine 100, a brief description of some of the items in agricultural machine 100, and their operation, will first be provided.

Communication system 212 can include wireless communication logic, which can be substantially any wireless communication system that can be used by the systems and components of agricultural machine 100 to communicate information to other items, such as between control system 208, sensor(s) 250, controllable subsystem(s) 222, as well as other systems and components. In another example, communication system 212 communicates over a controller area network (CAN) bus (or another network, such as an Ethernet network, etc.) to communicate information between those items. This information can include the various sensor signals and output signals generated by the sensor characteristics and/or sensed characteristics, and other items.

Furrow sensor system(s) 130 is configured to sense various characteristics relative to the furrow, agricultural surface surrounding the furrow, as well as characteristics relative to the operation of the agricultural machine 100. As shown in FIGS. 3 and 4, furrow sensor system(s) 130 can include a furrow sensor 132 and an illumination source 134. Furrow sensor 132 can comprise an imaging system, such as a camera, or any number of other sensors, including various other non-contact sensors. Furrow sensor system(s) 130 can be configured to sense a variety of characteristics, including, but not limited to, seed depth, furrow depth, soil color, soil moisture, soil composition, seed orientation, seed position, furrow shape, furrow width, seed location, seed count, seed location residue level, residue percentage, seed spacing, seed centering, substance (e.g., fertilizer) application, seed to soil contact, furrow sidewall smearing, furrow compaction, quality of closing furrow (e.g., level of soil coverage of seeds), moisture depth, moisture line relative to seed, seed movement relative to ground, as well as a variety of other characteristics, including characteristics relative to the quality of the furrow as well as the quality of the planting operation.

Position sensor(s) 252 are configured to sense position information relative to various components of agricultural machine 100. For example, position sensor(s) 252 can be used to sense the position and/or orientation of various items and components of agricultural machine 100, such as gauge wheel arm 136, arm contact member 138, furrow sensor system 130, as well as various other items. For example, a potentiometer, hall-effect sensor, as well as a variety of other sensors, can be used to sense the position (e.g. displacement) of the gauge wheel arm to determine the depth of engagement of opener 120 with the soil. Additionally, position sensor(s) 252 can sense a distance of various components or items of agricultural machine from, for example, the agricultural surface on which agricultural machine 100 is operating as well as a distance from other various components and items of agricultural machine 100.

Terrain sensor(s) 254 are configured to sense characteristics of the agricultural surface over which agricultural machine 100 is traveling. For instance, terrain sensor(s) 254 can detect the topography of the field (which may be downloaded as a topographical map or sensed with sensors) to determine the degree of slope of various areas of the field, to detect a boundary of the field, to detect obstacles or other objects on the field (e.g., rocks, root-balls, trees, etc.), among other things.

Environmental sensor(s) 256 are configured to sense various environmental characteristics, such as various weather characteristics, relative to the agricultural surface on which agricultural machine 100 is operating. For example, environmental sensor(s) 256 can detect the direction and speed of wind, precipitation, humidity, temperature, as well as various other conditions. This information can be obtained from a remote weather service as well.

Operation sensor(s) 258 are configured to sense characteristics relative to the operation of various subsystem(s) of agricultural machine 100. For example, operation sensor(s) 258 can sense the downforce being generated by downforce subsystem 240, characteristics relative to the delivery of seeds by seed delivery subsystem 230 (e.g., speed, count, distance between seeds, etc.), characteristics relative to the delivery of substance (e.g., fertilizer) by substance delivery subsystem 232, characteristics relative to the operating depth of depth subsystem 234, as well as operating characteristics and performance of the other subsystems.

Geographic position sensor(s) 260 include location sensor(s) 262, heading/speed sensor(s) 264, and can include other sensor(s) 266 as well. Location sensor(s) 262 are configured to determine a geographic location of agricultural machine 100 on the agricultural surface over which it is traveling. Location sensor(s) 262 can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Location sensor(s) 262 can also include other satellite-based sensors, cellular triangulation sensors, dead reckoning sensors, etc.

Heading/speed sensor(s) 164 are configured to determine a heading and speed at which agricultural machine 100 is traversing the agricultural surface during the planting operation. This can include sensors that sense the movement of ground-engaging elements (such as wheels or tracks 109 on towing vehicle 103) and/or can utilize signals received from other sources, such as location sensor(s) 162.

Sensor(s) 250 can comprise any number of different types of sensors. For example, but not by limitation, Hall Effect sensors, potentiometers, load cells, strain gauges, transduc-ers and various other mechanical and/or electrical sensors. Sensor(s) 250 can also comprise various electromagnetic radiation (ER) sensors, optical sensors, imaging sensors, thermal sensors, LIDAR, RADAR, Sonar, radio frequency sensors, audio sensors, inertial measurement units, accelerometers, pressure sensors, flowmeters, etc.

Additionally, while multiple sensors are shown, sensor(s) 250 can comprise a single sensor configured to produce a sensor signal indicative of multiple characteristics. For instance, a single imaging sensor (such as a camera) can be mounted on agricultural machine 100 (such as between opener 120 and closing wheel 124). The imaging sensor can generate an image that is indicative of characteristics relative to the operation of agricultural machine 100, characteristics relative to the furrow as well as characteristics relative to the agricultural surface. Additionally, it is to be understood that some or all of the sensor(s) 250 can be a controllable subsystem of agricultural machine 100. By way of example, control system 208 can generate a variety of control signals to control the operation, position, orientation as well as various other operating parameters of sensor(s) 250. For instance, the point of view of furrow sensor 132 of furrow sensor system 130 can be changed, as well as the focus, zoom, shutter speed, color filter, etc. Various other operating parameters of sensor 132 can be changed as well. In another example, the angle of illumination of illumination source 134 can be changed, for example by changing the orientation of illumination source 134, as well as the intensity (e.g., brightness), spectrum (e.g., wavelength) of the illumination, as well as various other operating parameters.

Agricultural machine 100, as illustrated in FIG. 5, can also include a data store 278. Data store 278 is configured to store various data, such as furrow data 280, agricultural surface data 281, environmental data 282, data generated by sensor(s) 250 as well as various other data 283. For example, the other data 283 can include historical data indicative of previous operations by agricultural machine 100, previous operations on the particular agricultural surface, previous crop yields, previous job quality and performance, such as previous furrow quality, operator/user input, as well as a variety of other data.

Of the controllable subsystem(s) 222, seed delivery subsystem 230 is configured to deliver seeds to a furrow generated by planter 101. Seed delivery subsystem 230 can include a hopper (e.g., 112) configured to store seeds to be delivered to the furrow, a seed metering system (e.g., 114) configured to meter seeds and provide the metered seed to a seed delivery system (e.g., 116) that delivers the seed from the seed metering system to the furrow generated by planter 101, as well as various other items and components. Seed delivery subsystem 230 can include, or be driven by, any of a number of different controllable actuators, such as a motor that is controlled by control signals generated by control system 208. Seed delivery subsystem 230 delivers seed to the furrow. For example, control system 208 can control the metering, the speed of conveyance, and number of seeds conveyed, by generating control signals to adjust or otherwise control the operating parameters of seed delivery subsystem 230.

Substance delivery subsystem 232 is configured to deliver substance, such as liquid or granular fertilizer, to a furrow generated by planter 101. Substance delivery subsystem 232 can include a hopper(s) configured to store the substance to be delivered to the furrow, conduit(s) extending from the hopper to an outlet through which the substance is conveyed, a number of controllable pump(s) and valve(s) to control the flow of substance through the conduit and out of the outlet, as well as various other items and components. For instance, control signals can be generated by control system 208 to control the pumps to increase or decrease flowrate of the substance to be delivered. In another example, control signals can be generated by control system 208 to control the valves between and open and closed position to control the flow of substance through the valves, for instance. Control system 208 can control the delivery of granular or other material as well.

Depth subsystem 234 is configured to control a depth of engagement of opener 120 with the soil, to thus control the depth of the furrow generated by planter 101. Depth subsystem 234 can include gauge wheel 122, gauge wheel arm 136, arm contact member 138 as well as a number of controllable actuators (e.g., hydraulic, electric, pneumatic, mechanical etc.) to control the position of components of depth subsystem 238, as well as various other items and components. For instance, the position of arm contact member 138 can be adjusted (such as by control system 208 generating a control signal to one of the controllable actuators) to correspondingly adjust an orientation of gauge wheel arm 136. Changing the orientation of gauge wheel arm 136 changes a position of gauge wheel 122. The position of gauge wheel 122, as explained above, controls the depth of engagement of furrow opener 120 with the soil and thus controls the depth of the furrow generated by planter 101.

Propulsion subsystem 236 is configured to propel agricultural machine 100 over the agricultural surface. It can include a power source, such as an internal combustion engine or other power source, and a set of ground-engaging elements (e.g., wheels or tracks 109), as well as a transmission. It can include individually driven wheels/tracks 109 as well. In one example, control system 208 receives characteristics detected by furrow sensor system 130 and generates control signals to control propulsion subsystem 236 to adjust the speed of agricultural machine 100 based on the characteristics detected by furrow sensor system 130.

Steering subsystem 238 is configured to control the heading of agricultural machine 100, by steering the ground-engaging elements (e.g., wheels or tracks 109). Steering subsystem 260 can adjust the heading of agricultural machine 100 based on control signals generated by control system 208. For example, based on a sensed location from location sensor(s) 262, control system 208 can generate control signals to control steering subsystem 238 to adjust the heading of agricultural machine 100 to comply with a desired course. The desired course can be identified based on, for instance, an operator/user input or a planter operation map.

The planter operation map can be generated based upon characteristics of the agricultural surface, characteristics of the furrow, as well as a variety of other characteristics detected by sensor(s) 250. The planter operation map can also be generated based upon historical data, such as a previous route during a previous operation, as well as an operator/user input that plots a map indicative of a desired course for agricultural machine 100.

Downforce subsystem 240 is configured to controllably exert downforce to keep planter 101 in desired engagement with the agricultural surface. Downforce subsystem 240 can include a downforce generator (e.g., 131) as well as various other actuators (e.g., hydraulic, electric, pneumatic, mechanical, etc.) to controllably exert downforce. Downforce subsystem 240 can also include various other items and components. Downforce subsystem 240 can adjust the downforce based on control signals generated by control system 208. For example, based upon characteristics sensed by terrain sensor(s) 254 (such as an upcoming change in slope of the terrain, presence of obstacles in the route of agricultural machine 100, etc.), control system 208 can generate control signals to adjust the downforce exerted by downforce subsystem 240. In another example, based upon characteristics sensed by furrow sensor system 130 (such as furrow depth, furrow shape, furrow width, etc.) control system 208 can generate control signals to adjust the downforce exerted by downforce subsystem 240.

Positional subsystem 242 is configured to controllably adjust the position of various components and items on agricultural machine 100. Positional subsystem 242 can include a variety of controllable actuators (e.g., hydraulic, electric, pneumatic, mechanical, etc.), as well as a variety of other items and components. Positional subsystem 242 can control the position of various components and items on agricultural machine 100 based on control signals generated by control system 208. For example, based upon characteristics sensed by sensor(s) 250, control system 208 can generate control signals to adjust the position of furrow sensor 132 (such as to adjust the point of view) and/or illumination source 134 (such as to adjust the angle of illumination), as well as various other operating parameters.

Controllable subsystem(s) 222 can include a variety of other subsystem(s) 244. For example, a cleaner subsystem that includes a row cleaner (e.g., 118) and a number of actuators (e.g., hydraulic, electric, pneumatic, mechanical, etc.). The cleaner subsystem is configured control the level of cleaning performed by agricultural machine 100. For instance, the cleaner subsystem can control the engagement of the row cleaner with the agricultural surface to remove obstacles from the agricultural surface such as debris, crop residue, rocks, and various other obstacles. By way of example, based upon characteristics sensed by sensor(s) 250, control system 208 can generate control signals to adjust the depth of engagement of the row cleaner with, or pressure exerted by the row cleaner on, the agricultural surface.

Control system 208 is configured to receive sensor signals from sensor(s) 250 indicative of various characteristics, as well as from other components of agricultural machine 100 (e.g., data store 278). Control system 208 generates a variety of control signals to control controllable subsystem(s) 222 based on the received sensor signals, as well as other data received by control system 278, such as from data store 278.

While not illustratively listed separately, control system 208 can include a variety of other controllers 246, including, but limited to, respective/dedicated controller(s) for each of the controllable subsystem(s) 222. For instance, control system 208 can include a seed delivery subsystem controller configured to generate control signals to control the operation of seed delivery subsystem 230, a substance delivery subsystem controller configured to generate control signals to control the operation of substance delivery subsystem 232, a depth subsystem controller configured to generate control signals to control the operation of depth subsystem 234, a propulsion subsystem controller configured to generate control signals to control the operation of propulsion subsystem 236, a steering subsystem controller configured to generate control signals to control the operation of steering subsystem 238, a downforce subsystem controller configured to generate control signals to control the operation of downforce subsystem 240, a positional subsystem controller configured to generate control signals to control the operation of position subsystem 242, and a variety of other controllers configured to generate control signals to control the operation of various other subsystem(s) 244.

In one example, control system 208 controls the operation and performance of agricultural machine 100. By way of example, it can generate control signals for controllable subsystem(s) 222 based on sensor signals received from sensor(s) 250. For instance, based on characteristics detected by furrow sensor system 130, control system 208 can generate control signals to control the operation and performance of agricultural machine 100. Based upon characteristics detected by furrow sensor system 130, control system 208 can generate control signals to control the operation and performance of seed delivery system 230. For example, based upon a detected seed spacing, seed count, seed position of seeds, etc., control system 208 can generate control signals to control the operation of seed delivery system 230, such as by adjusting the metering and/or delivery of seeds. Based upon a detected material application, level, location, volume, etc. of substance applied to the furrow, control system 208 can generate control signals to control the operation of substance delivery system 232 such as by adjusting the flow rate of substance. Based upon a detected depth of the furrow, detected location of a moisture line, etc., control system 208 can generate control signals to control the operation of depth subsystem 234 to change a depth of engagement of opener 120 with the soil. Based upon a detected furrow depth, furrow shape, closing quality, furrow sidewall smearing, etc., control system 208 can generate control signals to control the operation of propulsion subsystem 236 to adjust the speed of agricultural machine 100. Based upon a detected furrow shape, etc., control system 208 can generate control signals to control the operation of steering subsystem 238 to adjust the heading of agricultural machine 100. Based upon a detected furrow shape, furrow depth, furrow width, furrow sidewall smearing, etc., control system 208 can generate control signals to control the downforce exerted by downforce subsystem 240. Based upon a detected quality of an image, such as clarity, generated by furrow sensor system 130, control system 208 can generate control signals to control the position or operating parameters of both or either of furrow sensor 132 or illumination source 134. Based upon a variety of other characteristics detected by furrow sensor system 230, control system 208 can generate control signals to control the operation of other subsystem(s) 244, as well.

Agricultural machine 100 also includes one or more processor(s) or server(s) 284. It can include other items 286 as well, such as user input mechanisms, user interface devices, displays, machine controls (e.g., levers, buttons, pedals, joysticks, steering wheels, etc.), etc.

FIG. 6 is a block diagram illustrating one example of control system 208 in more detail. Control system 208 can include furrow quality determination system 302, furrow characteristic prediction system 308, data capture logic 314, alert/notification system 322, processor(s)/controller(s) 284, communication controller 210, action signal generator 324, map generator 326, data distribution generator 328, model generator 330, and it can include other items 332 as well. Furrow characteristics determination system 302 can include furrow quality logic 304, change identifier 305, and it can include other items 306 as well. Furrow characteristic prediction system 308 can include furrow quality prediction logic 310 and it can include other items 312 as well. Data capture logic 314 can include sensor accessing logic 316, data store accessing logic 318, and it can include other items 320 as well.

In operation, control system 208 determines and/or predicts the quality of a furrow generated or to be generated by the agricultural machine 100. For example, based on sensor signals received from sensor(s) 250, data retrieved from data store 278, and/or signals and data received from various other items and components of agricultural machine, control system 208 determines and/or predicts a furrow quality. The furrow quality can then be compared by change identifier 305 to see whether the furrow quality has changed significantly. Based on the furrow quality, and whether it has changed, action signals are generated and used to control the operation of agricultural machine 100 or to generate displays, recommendations, and/or other indications (e.g., alerts).

Data capture logic 314 captures or obtains data that can be used by other items on control system 208. Data capture logic 314 can include sensor accessing logic 316, data store accessing logic 318, and other logic 320. Sensor accessing logic 316 can be used by furrow quality determination system 302 and/or furrow characteristic prediction system 308 to obtain sensor data (or values indicative of the sensed variables) provided from sensor(s) 250 that can be used to determine and/or predict furrow quality. In one example, sensor accessing logic 316 receives sensor signals from furrow sensing system 130 indicative of various characteristics relative to a furrow generated by agricultural machine 100. Such characteristics can include, but are not limited to, seed depth, furrow depth, soil color, soil moisture, soil composition, seed orientation, seed position, furrow shape, furrow width, seed location, seed count, seed location residue level, residue percentage, seed spacing, seed centering, substance (e.g., fertilizer) application, seed to soil contact, furrow sidewall characteristics (e.g., smearing), furrow compaction, quality of closing furrow (e.g., level of soil coverage of seeds), moisture depth, moisture line relative to seed, seed movement relative to ground, as well as a variety of other characteristics.

Additionally, data store accessing logic 318 can be used to obtain data previously stored on a data store (e.g., 278) and/or data previously stored at remote computing system(s) 214. For example, this can include data that was sensed and stored during a previous agricultural operation, or otherwise sensed and stored previously. This data can include, but is not limited to previous furrow quality determinations, previous operating parameters of agricultural machine 100 (or another machine), previously sensed characteristics of a furrow, such as those mentioned above, as well as a variety of other previously sensed or otherwise stored characteristics.

Upon receiving sensor data or indications of the sensed characteristics, furrow quality determination system 302 can determine a metric indicative of the quality of the furrow generated by agricultural machine 100. This can include furrow quality logic 304 extracting and assigning values to the characteristics and/or agronomic factors indicated by the sensor signals generated by sensor(s) 250, such as images taken by furrow sensing system 130. Extracting and assigning values can include a determination of the characteristic indicated by the sensor signal (e.g., as a value) and assigning a scaled numerical value to the determined characteristic. For illustrative example, from an image of the furrow, furrow quality logic 304 can determine a value for spacing of a seed (or seeds) relative to other seeds. This may include, an average seed spacing across the section of furrow captured in the image. This average can be determined to be x inches, for example. Data quality logic 304 can then assign a scaled numerical value to the determined characteristic that is indicative of seed spacing quality relative to ideal and/or prescribed seed spacing. In the assignment of values of the characteristics indicative of quality, data quality logic 304 can take into account numerous considerations, such as historical data (e.g., previous quality determinations, previous operation data, etc.), operator/user input (e.g., a prescribed or otherwise desired characteristic, such as a prescribed seed spacing), expert knowledge, ideal furrow characteristics (e.g., characteristics of an ideal furrow or comparison to an image of an ideal furrow, etc.), different combinations of considerations, environmental conditions, agricultural surface characteristics (e.g., soil characteristics), as well as numerous other considerations. Logic 304 can employ machine learning and/or other artificial intelligence mechanisms.

Furrow quality logic 304 can utilize a variety of processing and/or extraction techniques. These techniques can include color modeling (e.g., RGB), edge detection, black/white analysis, machine learning, neural networks, pixel testing, pixel clustering, shape detection, as well as various other techniques.

Furrow quality logic 304 determines and generates a furrow quality metric indicative of the quality of the furrow generated by the agricultural machine through an algorithmic process. The furrow quality can be identified at a point on the field by an instantaneous value. Also, a plurality of instantaneous values can be aggregated to establish a representative value, and the instantaneous value can be compared to the representative value, by change identifier 305 to determine whether a change in furrow quality has occurred. Obtaining the representative value can include an aggregation of individual data points or values, indicative of individual characteristics of the furrow, to determine an overall quality of the furrow. For example, each characteristic indicated by the sensor signal (and then, in some examples, extracted as a value from the sensor signal) can be assigned a scaled value. These scaled values can be aggregated (e.g., by an average, weighted average, median, as well as any other aggregation techniques). The aggregation of the individual characteristic values into a furrow quality metric can be based on a variety of considerations or techniques, such as operator/user input (e.g., operator/user inputs weighted and/or prioritized characteristics), expert knowledge, historical data (e.g., previous furrow quality determination, previous crop yield information corresponding to previous furrow quality, etc.), machine learning, a combination of considerations and techniques, as well as a variety of other considerations and techniques. In this way, furrow quality logic 304 determines a furrow quality metric that can be based on a fusion of many agronomic factors and characteristics, wherein the furrow quality metric indicates an overall quality of the furrow. Change identifier 305 can also determine how and when the furrow quality changes (based on soil conditions, residue conditions, etc.) to determine whether a control change is needed as well. In this way the operator/user is presented with information that indicates the quality of the environment that the seed is being placed into rather than a presentation of individual characteristics (e.g., residue level).

Based on the determined furrow quality metric, and change information, furrow quality determination system 302 can generate various indications via alert/notification system 322. This can be done, for example, by surfacing a display or other indication to operator interface(s) 226 for operator 228. It can also be done by surfacing a display or other indication to remote computing system(s) 214 for remote user 218. The furrow quality metric can be displayed as a value, such as a score on a scale (e.g., 1-10, A-F, or percentage out of 100%, etc.). This value or rating code can then be displayed to the operator in real time and/or stored along with the geospatial location and mapped for later viewing. Additionally, alert/notification system 322 can provide the value to action signal generator 324 which can generate various control signals to control various subsystems (e.g., controllable subsystem(s) 222) of agricultural machine 100. Additionally, furrow quality determination system 304 can store the determined furrow quality metric, as well as the corresponding sensor signals (e.g., image(s)), and the extracted and assigned values used in the determination of the particular furrow quality metric in a data store 278, or elsewhere, for later reference or use.

To perform automated control based on the furrow quality metric indicative of the quality of the furrow generated by agricultural machine 100, and any changes in furrow quality, furrow quality determination system 302 can generate control signals to control the delivery of seeds by seed delivery subsystem 230, the delivery of substance (e.g., fertilizer) by substance delivery system 232, the depth of engagement of opener 120 with the soil by depth subsystem 234, the speed of agricultural machine 100 by propulsion system 236, the heading of agricultural machine 100 by steering subsystem 238, the downforce exerted by downforce subsystem 240, the position of various components and/or items of agricultural machine 100 by positional subsystem 242, as well as variety of other operating parameters by other subsystem(s) 244 or combinations thereof.

The generation of control signals by action signal generator 324 can be based upon a comparison to a furrow quality threshold. As an example, if the determined furrow quality is not within a furrow quality threshold, then control signals are automatically generated to control the operation of agricultural machine 100 or to generate displays, recommendations, and/or other indications (e.g., alerts). For instance, upon a determination that the determined furrow quality is not within the furrow quality threshold, alert/notification system 322 can control an operator/user interface mechanism to automatically generate an alert or other indication. In another example, map generator 326 can control an operator/user interface mechanism to surface a map showing an indicator (e.g., a flag on the map) that indicates the geographic position on the agricultural surface where the furrow quality was below the threshold. The furrow quality threshold can be based upon operator/user input, desired yields, expert knowledge, historical data, ideal furrow characteristics, machine learning, a combination of considerations, as well as various other considerations.

As illustrated in FIG. 6, control system 208 can also include furrow characteristic prediction system 308. Furrow characteristic prediction system 308 includes furrow quality prediction logic 310 and can include other logic 312 as well. Prediction system 308 predicts a likely quality of a furrow to be generated by agricultural machine 100. This determination can be based on a variety of data that can be accessed in real-time or near real-time via sensor accessing logic 316, or data accessing logic 318 can access data (e.g., historical data, management data, user/operator input, etc.) from data store 278. Additionally, prediction system 308 can update the determinations periodically or intermittently either prior to or throughout an agricultural operation. These determinations can be provided to operator 228 on operator interface(s) 226, to remote user 218 on remote computer system(s) 214, to control system 208, to model generator 330, as well as various other components of agricultural machine 100.

Furrow quality prediction logic 310 allows operator 228 or remote user 218 to enter values for operational parameters of controllable subsystem(s) 222 to see their likely effect on furrow quality rather than to see their likely effect on a particular characteristic of the furrow. For instance, in the case of furrow depth, instead of entering in a depth of engagement of opener 120 and expecting or receiving an indication of a likely corresponding depth of the furrow, furrow quality prediction logic 310 can surface an indication to operator 228 or remote user 218 indicative of the likely furrow quality based upon the prospective depth of engagement of opener 120 (and the other operating parameters of the agricultural machine, as well as data accessed from various sources such as sensor(s) 250 and/or data store 278). This allows an operator to simulate the adjustment of various operating parameters of controllable subsystem(s) 222 and to see the likely effect on furrow quality.

As briefly described above, control system 208 also includes map generator 326. Map generator 326 is, in one example, configured to generate a map indicative of a desired route and operating parameters for agricultural machine 100. The map can be based upon historical data, such as previous operations on the particular agricultural surface or previous operations of agricultural machine 100 retrieved from a data store 278 by data store accessing logic 318. The map can also be based on sensor signals accessed by sensor accessing logic 316. For instance, the route indicated by the map can be based on geographic position information (e.g., field boundaries, etc.), terrain information (e.g. slope, obstacles, etc.), agricultural surface characteristics (e.g., soil composition, soil moisture, soil compaction, etc.), environmental information (e.g., wind speed and direction, precipitation, etc.) as well as a variety of other information. In addition to generating a route for agricultural machine 100, map generator 326 can also map indications of suggested operational parameters for agricultural machine 100 at different geographic locations on the agricultural surface to optimize furrow quality, efficiency, etc. The map can be used for automatic control (e.g., by control system 208) or manual control (e.g., by operator 228 or remote user 216) of agricultural machine 100. By automatic, it is meant, as an example, that the operation can be performed without further operator/user involvement, except perhaps, to initiate or authorize the operation.

In another example, map generator 326 is configured to generate a map indicative of the operation of agricultural machine 100 on a particular agricultural surface. This can include a map of the agricultural surface that indicates a route traveled by the agricultural machine as well as indicators that correspond to, for example, furrow quality at particular geographic locations on the agricultural surface.

As illustrated in FIG. 6, control system 208 includes data distribution generator 328. Data distribution generator 328 is configured to track furrow quality and generate displays and other indications of furrow quality as well as various other metrics, for example in a time history distribution. For example, data distribution generator 328 can generate a time history distribution indicative of furrow quality over time. Data distribution generator 328 can track and display a variation in furrow quality throughout a single operation or over multiple operations performed over a single season or multiple seasons, with individual furrow quality metrics georeferenced to particular locations on the agricultural surface. This information can be used by data distribution generator 328 to determine and display various metrics indicative of furrow quality over time. For instance, generator 328 can generate and display a standard deviation of furrow quality over a particular operation, or over multiple operations performed over a single season or over multiple seasons. In another example, anomalies in the data can be flagged and presented to operator 228 or remote user 218. For example, if the percentage of the time that seeds are not placed in an ideal or desired environment exceeds a normal or acceptable time, this can be flagged for the operator 228 or remote user 218. In another example, data distribution generator 328 can display an average furrow quality metric over a given amount of time (e.g. a single season, multiple seasons, a single operation, multiple operations, etc.). In this way, operator 228 or remote user 218 can see the effect of adjustment to operation parameters on the furrow quality over time.

Additionally, data distribution generator 328 can generate data distributions indicative of furrow quality in comparison to other metrics. For example, data distribution generator 328 can generate a map (or various other displays, graphs, models, etc.) indicative of a comparison of furrow quality to yield. For instance, a map can be generated that displays a value indicative of yield at given geographic locations on the agricultural surface in addition to displaying the furrow quality metric associated with each respective geographic location (e.g., as an overlay on the yield map or in other ways). In this way, operator 228 or remote user 218, as well as control system 208, can determine the effect of furrow quality on yield and/or the correlation of furrow quality to yield. Similar distributions can be generated for various other metrics. For example, a map can be generated that displays a value indicative of machine efficiency (e.g. fuel consumption, operation time, etc.) at given geographic locations on the agricultural surface in addition to displaying the furrow quality metric associated with each respective geographic location. In this way, operator 228 or remote user 218, as well as control system 208, can determine the effect of furrow quality on machine efficiency. Data distribution system 328 can generate and display (or otherwise output) this and various other data in a variety of ways and is not just limited to maps. Furthermore, data distribution generator 328 can generate control signals through action signal generator 324 to display or otherwise surface an indication of the distributed data, for example to operator 228 on operator interface(s) 226 as well as to remote user 218 on remote computing system(s) 214.

Control system 208 also includes model generator 330 configured to generate a furrow quality model based on likely furrow quality values generated by furrow characteristic prediction system 308. For example, an operator 228 or user 218 can input prospective operation parameters for controllable subsystem(s) 222 and model generator 330 can generate a model indicative of likely furrow quality over a given time period, on a given agricultural surface, or at a particular location on an agricultural surface. In this way operator 228 or user 218 can see the likely effect of adjustments to particular operational parameters on the quality of the furrow rather than on individual characteristics of the operation or of the furrow. For example, by providing a prospective adjustment to the operation of opener 120, model generator 330 provides an indication of the effect of the prospective adjustment on the quality of the furrow rather than just the effect on the depth of the furrow (which may or may not, by itself, determine or otherwise affect furrow quality). Additionally, model generator 330 can generate control signals through action signal generator 324 to display or surface an indication of the model to operator 228 on operator interface(s) 226 as well as to remote user 218 of remote computing system(s) 214.

Figure 7:
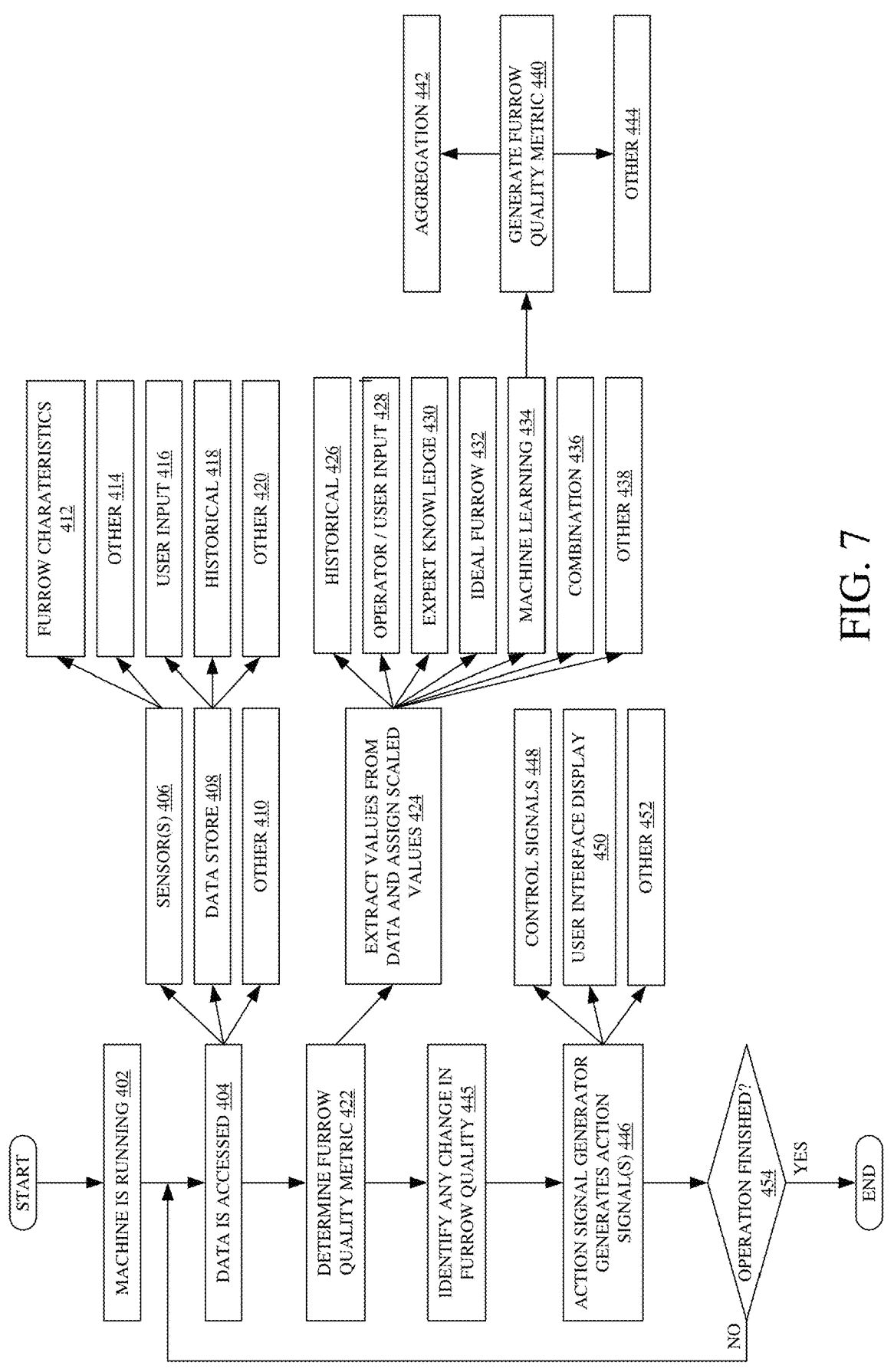
FIGS. 7-8 are flow diagrams showing example operations of the control system illustrated in FIG. 6.
Figure 8:
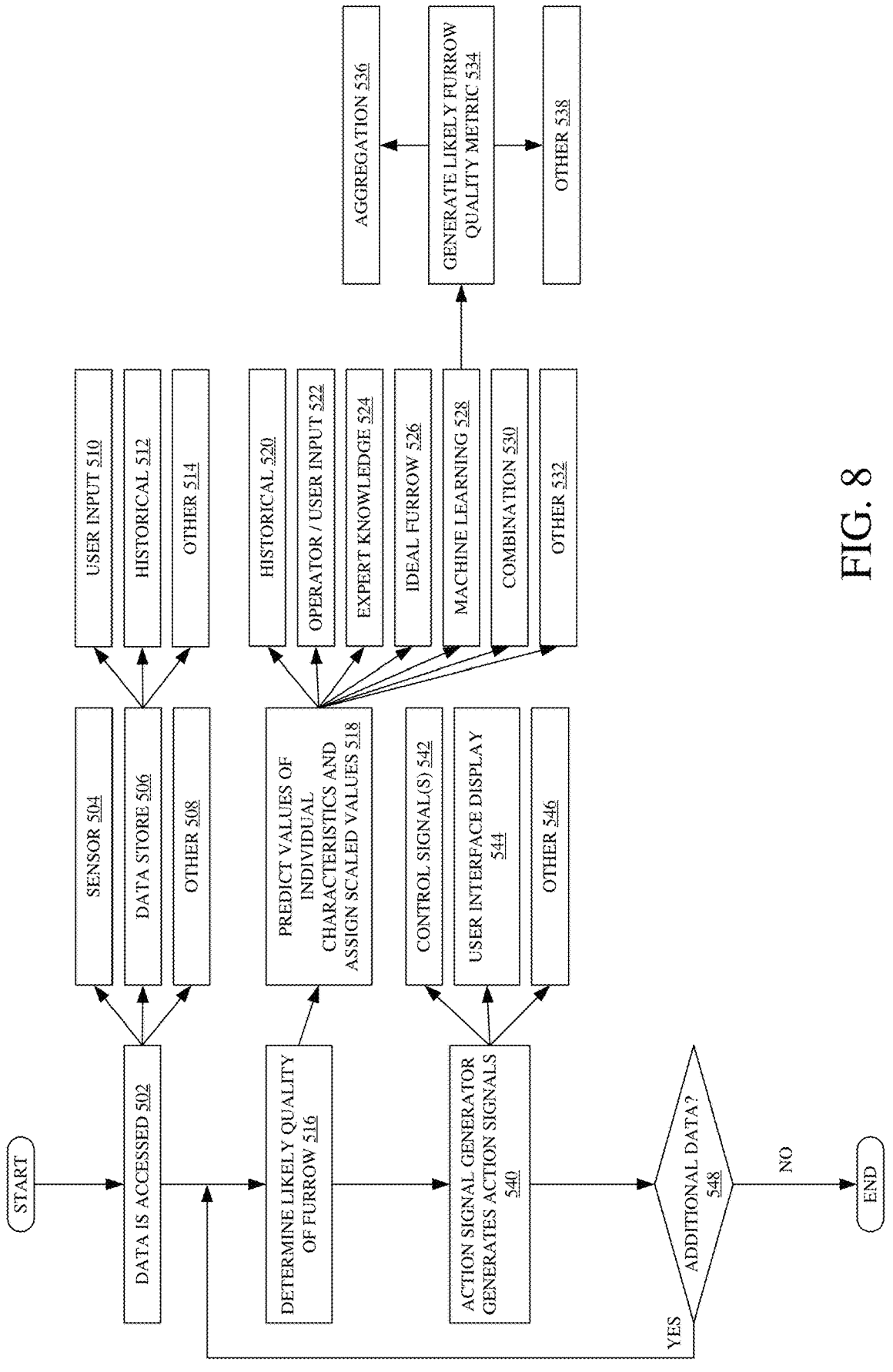

FIGS. 7-8 are flow diagrams showing example operations of a control system 208 illustrated in FIG. 6. The operation shown in FIG. 7 is one example of the operation of the system shown in FIG. 6 in determining a furrow quality metric relative to a furrow generated by agricultural machine 100. It is to be understood that the operation can be carried out at any time or at any point throughout an agricultural planting operation, or even if an operation is not currently underway. Further, while the operation will be described in accordance with agricultural machine 100, it is to be understood that other agricultural machines with a control system 208 can be used as well.

It is initially assumed that agricultural machine 100 is running, as indicated by block 402. For instance, operator 228 or remote user 218 can provide initial machine settings that set the operating parameters for the controllable subsystem(s) 222 of agricultural machine 100 as well as the operating parameters and settings for various other items and components of agricultural machine 100. The operator or user can input these settings manually based upon his or her own prior experience and knowledge. The initial settings can also be made automatically by agricultural machine 100 itself. In another example, prior operation settings (e.g., previous year settings) or estimated settings can be downloaded from a data store 278. Initial machine settings can be input in various other ways, including, but not by limitation, through a touch screen or other user input mechanism.

During operation of agricultural machine 100, data is accessed or otherwise received as indicated by block 404. For example, sensor signals are received from sensor(s) 250 as indicated by block 406. However, sensor signals can also be received from a variety of other sensors of other systems on other mobile machines. Sensor signals can include furrow characteristics information, as indicated by block 412. Sensor signals can also include a variety of other sensor signals 414 as well, for example, but not limited to, terrain information, position information, environmental information, operational information, and geographic position information (such as location, heading, speed, etc.). These are examples only.

In another example, data is accessed or otherwise received from a data store as indicated by block 408. The data obtained from a data store at block 406 can include data input by an operator/user, as indicated by block 416, historical data as indicated by block 418, as well as other data 420. By way of example, data input by an operator/user can be related to desired furrow quality and/or desired furrow characteristics. Historical data can be obtained that is indicative of previous operating settings, previous furrow quality metric determinations, previous furrow characteristics, previous operation data, previous yield data, as well as a variety of other data, such as expert knowledge data indicative of quality furrow characteristics as well as stored images of ideal furrows.

Once the data is accessed or otherwise received at block 404, processing proceeds at block 422 where a furrow quality metric is determined, based on the data. In one example, furrow quality determination system 302 extracts values from sensor signals received from sensor(s) 250 (e.g., an image of the furrow captured by furrow sensor system(s) 130) indicative of characteristics of the furrow (e.g., values indicating seed spacing, furrow depth, etc.) and assigns a scaled value to the individual characteristics indicative of the quality of that particular characteristic (e.g., a score on a scaled range, such as 1-10, A-F, 0-100%, etc.). This is indicated by block 424.

In assigning the scaled values of individual characteristics, furrow quality determination system 302 can account for various considerations, such as historical data (e.g., previous quality determinations, previously assigned values, etc.), as indicated by block 426, operator/user inputs (e.g., desired or prescribed values and/or range of values of individual characteristics, such as desired furrow depth for instance), as indicated by block 428, expert knowledge (e.g., stored in data store 278), as indicated by block 430, ideal furrow characteristics (e.g., based on previous high quality furrows, a comparison to images of ideal furrows, etc.), as indicated by block 432, machine learning (e.g., a consideration of previous individual characteristic scaled values and the corresponding crop yield, the corresponding machine efficiency, etc.), as indicted by block 434, a combination of considerations, as indicated by block 436, as well as various other considerations, as indicated by block 438.

In one example, after extracting values of individual characteristics and assigning scaled values to the individual characteristics at block 424, processing proceeds at block 440 where a furrow quality metric is generated. In generating a furrow quality metric, furrow quality determination system 302 can perform an aggregation of either or both of the extracted values of individual characteristics and/or the assigned scaled values, as indicated by block 442. The aggregation can be based on operator/user inputs, expert knowledge, ideal furrow characteristics, machine learning, historical data, a combination of considerations, as well as various other considerations and factors. In this way, a furrow quality metric is generated, based on a fusion of various agronomic factors and/or furrow characteristics, that is indicative of an overall quality of the furrow. In one example, the aggregation at block 442 can comprise the generation of a mean average or weighted mean average of the assigned scaled values. In the example of a weighted mean average, values of individual characteristics of the furrow and/or assigned scaled values of individual characteristics of the furrow can be weighted (e.g., given more weight to the overall furrow quality relative to other individual values) based on a variety of considerations or factors, such as, but not limited to, operator/user inputs, expert knowledge, historical data, ideal furrow characteristics, machine learning, a combination of consideration and/or factors, as well as a variety of other consideration or factors. Various other data processing techniques can also be used, including various other summary statistic techniques, as indicated by block 444.

Change identifier 305 can also determine if and how the furrow quality has changed. It can do this by comparing the instantaneous furrow quality metric (or a group of metrics) to a representative value, such as an aggregation of furrow quality values. Identifying changes in the furrow quality is indicated by block 445.

Once a determination of the furrow quality metric has been made at block 422, and any changes are identified at block 445, processing proceeds at block 446 where action signal generator 324 generates an action signal. In one example, action signals can be used to control a subsystem of agricultural machine 100, as indicated by block 448, to generate a user interface display (or other indication, e.g., an alert), as indicated by block 450, or in other ways as indicated by block 452. Control signal(s) can be used to modify or otherwise control an operating parameter of agricultural machine 100. For example, a control signal can be generated and provided to controllable subsystem(s) 222 of agricultural machine 100 which can include seed delivery subsystem 230, substance delivery subsystem 232, depth subsystem 234, propulsion subsystem 236, steering subsystem 238, downforce subsystem 240, position subsystem 242, as well as various other subsystems 244, such as, but not limited to, a cleaning subsystem.

By way of example, a control signal can be provided to seed delivery subsystem 230 to control the metering of seeds being delivered to the furrow. A control signal can be provided to substance delivery subsystem 232 to control the application of fertilizer to the furrow. A control signal can be provided to depth subsystem 234 to control the depth of engagement of furrow opener 120 to control the depth of the furrow. A control signal can be provided to propulsion subsystem 236 to control the speed at which agricultural machine 100 travels over the agricultural surface. A control signal can be provided to steering subsystem 238 to control the heading of agricultural machine 100 as it travels over the agricultural surface. A control signal can be provided to downforce subsystem 240 to control the downforce exerted on row unit 106. A control signal can be provided to position subsystem 242 to control the point of view of furrow sensor 132 or the angle of, or intensity of, illumination of illumination source 134. These are merely examples. Control signals can also be generated to control other subsystems 244, for instance a cleaning subsystem, and/or other components and items 286 of agricultural machine 100.

Processing then proceeds at block 454 where it is determined whether the agricultural operation (e.g., planting operation) is finished. If, at block 454, it is determined that the agricultural operation has not been finished, processing proceeds at block 404 where additional data is accessed or otherwise obtained. If, at block 454, it is determined that the operation has finished, then processing ends.

FIG. 8 is one example of furrow characteristic prediction system 308 determining a likely furrow quality metric. It is to be understood that the operation can be carried out at any time or at any point through an agricultural planting operation, or even if an operation is not currently underway (e.g., during a pre-planting operation). Further, while the operation will be described in accordance with agricultural machine 100, it is to be understood that other mobile machines with a control system 208 can be used as well.

Processing begins at block 502 where data capture logic 314 of control system 208 obtains data relating to a planting operation to be performed by agricultural machine 100 on an agricultural surface. In one example, data capture logic 314 obtains data generated by sensor(s) 250, as indicated by block 504, data from a data store 278, as indicated by block 506, and/or from other sources, as indicated by block 508. The data obtained from sensor(s) 250 at block 504 can include sensor data indicative of various characteristics of the agricultural surface to be operated on, for example environmental sensor data (e.g., current and previous weather conditions relative to the agricultural surface) from environmental sensor(s) 256, terrain sensor data (e.g., slop of terrain, obstacles in the path of agricultural machine 100, etc.) from terrain sensor(s) 254, current operating parameter data (e.g., current depth settings, current seed delivery settings, current downforce exertion, current substance delivery settings, etc.) from operation sensor(s) 258, agricultural surface characteristics (e.g., soil composition, soil moisture levels, etc.) from furrow sensor system(s) 130, as well as a variety of other sensor data from other sensor(s) 268.

The data obtained from a data store at block 506 can include data input by an operator/user, as indicated by block 510, historical data as indicated by block 512, as well as other data 522, for example, expert knowledge, machine learning algorithms, ideal furrow characteristics, previously sensed characteristics (e.g., previous images of furrows), as well as a variety of other data stored on data store 278. By way of example, data capture logic 314 can obtain data input by an operator/user such as an input indicative of an operating parameter (e.g., a prospective machine setting) of one or more of controllable subsystem(s) 222. In another example, data capture logic 314 can obtain historical data relative to previous operating parameters of agricultural machine and the furrow quality metric determination corresponding to those operating parameters. These are examples only. Data capture logic 314 can obtain a variety of other data as well.

Once the data is accessed at block 502, processing proceeds at block 516 where furrow characteristic prediction system 308 determines a likely furrow quality metric of the furrow to be opened, based on the data. In one example, furrow characteristic prediction system 308 predicts values of individual characteristics of the furrow to be opened (e.g., soil composition, moisture level, seed spacing, furrow depth, substance application, etc.) and assigns a scaled valued to the individual characteristics indicative of the quality of that particular characteristic (e.g., a score on a scaled range, such as 1-10, A-F, 0-100%, etc.). This is indicated by block 518. In assigning the scaled values of individual characteristics, furrow characteristic prediction system 308 can account for various considerations, such as historical data (e.g., previous quality determinations, previously assigned values, etc.), as indicated by block 520, operator/user inputs (e.g., desired or prescribed values and/or ranges of values of individual characteristics, such as desired furrow depth for instance), as indicated by block 522, expert knowledge (e.g., stored in data store 278), as indicated by block 524, ideal furrow characteristics (e.g., based on previous high quality furrows, a comparison to images of ideal furrows, etc.), as indicated by block 526, machine learning (e.g., a consideration of previous individual characteristic scaled values and the corresponding crop yield, the corresponding machine efficiency, etc.), as indicated by block 528, a combination of considerations, as indicated by block 530, as well as various other considerations, as indicated by block 532.

In one example, after predicting likely values of individual characteristics and assigning scaled values to the individual characteristics at block 518, processing proceeds at block 534 where a likely furrow quality metric is generated. In generating a likely furrow quality metric, furrow characteristic prediction system 308 can perform an aggregation of either or both of the extracted values of individual characteristics and/or the assigned scaled values, as indicated by block 536. The aggregation can be based on operator/user inputs, expert knowledge, ideal furrow characteristics, machine learning, historical data, a combination of considerations, as well as various other considerations and factors. In this way, a likely furrow quality metric is generated, based on a fusion of various likely agronomic factors and/or likely furrow characteristics, that is indicative of a likely overall quality of the furrow. An operator/user can see the likely effects that a change in operating parameters has on the overall furrow quality rather than just on individual characteristics of the furrow. In one example, the aggregation at block 536 can comprise the generation of a mean average or weighted mean average of the assigned scaled values. In the example of a weighted mean average, values of individual characteristics of the furrow and/or assigned scaled values of individual characteristics of the furrow can be weighted (e.g., given more weight to the overall furrow quality relative to other individual values) based on a variety of considerations or factors, such as, but not limited to, operator/user inputs, expert knowledge, historical data, ideal furrow characteristics, machine learning, a combination of consideration and/or factors, as well as a variety of other consideration or factors. Various other data processing techniques can also be used, including various other summary statistic techniques, as indicated by block 538.

Once a determination of the likely furrow quality metric has been made at block 516, processing proceeds at block 540 where action signal generator 324 generates an action signal. In one example, action signals can be used to control a subsystem of agricultural machine 100, as indicated by block 542, to generate a user interface display (or other indication, e.g., an alert), as indicated by block 544, or in other ways as indicated by block 546. Control signal(s) can be used to modify or otherwise control an operating parameter of agricultural machine 100. For example, a control signal can be generated and provided to controllable subsystem(s) 222 of agricultural machine 100 which can include seed delivery subsystem 230, substance delivery subsystem 232, depth subsystem 234, propulsion subsystem 236, steering subsystem 238, downforce subsystem 240, position subsystem 242, as well as various other subsystems 244, such as, but not limited to, a row/residue cleaning subsystem. For instance, if the likely furrow quality metric predicted by furrow characteristic prediction system 308 meets a quality threshold, the prospective operating parameters input by the operator/user can be automatically applied to the operation of agricultural machine 100 by providing control signals to a corresponding controllable subsystem.

By way of example, a control signal can be provided to seed delivery subsystem 230 to control the metering of seeds being delivered to the furrow. A control signal can be provided to substance delivery subsystem 232 to control the application of fertilizer to the furrow. A control signal can be provided to depth subsystem 234 to control the depth of engagement of furrow opener 120 in order to control the depth of the furrow. A control signal can be provided to propulsion subsystem 236 to control the speed at which agricultural machine 100 travels over the agricultural surface. A control signal can be provided to steering subsystem 238 to control the heading of agricultural machine 100 as it travels over the agricultural surface. A control signal can be provided to downforce subsystem 240 to control the downforce exerted on row unit 106. A control signal can be provided to position subsystem 242 to control the point of view of furrow sensor 132 or the angle of illumination of illumination source 134. These are merely examples. Control signals can also be generated to control other subsystems 244, for instance a row/residue cleaning subsystem, and/or other components and items 286 of agricultural machine 100.

Processing then proceeds at block 548 where it is determined whether additional data has been obtained or otherwise accessed. If at block 548, it is determined that additional data has been obtained or otherwise accessed, processing proceeds at block 516 where furrow characteristic prediction system 308 continues to determine a likely furrow quality metric. If, at block 548, it is determined that additional data has not been obtained or otherwise accessed, then processing ends.

Figure 9A:
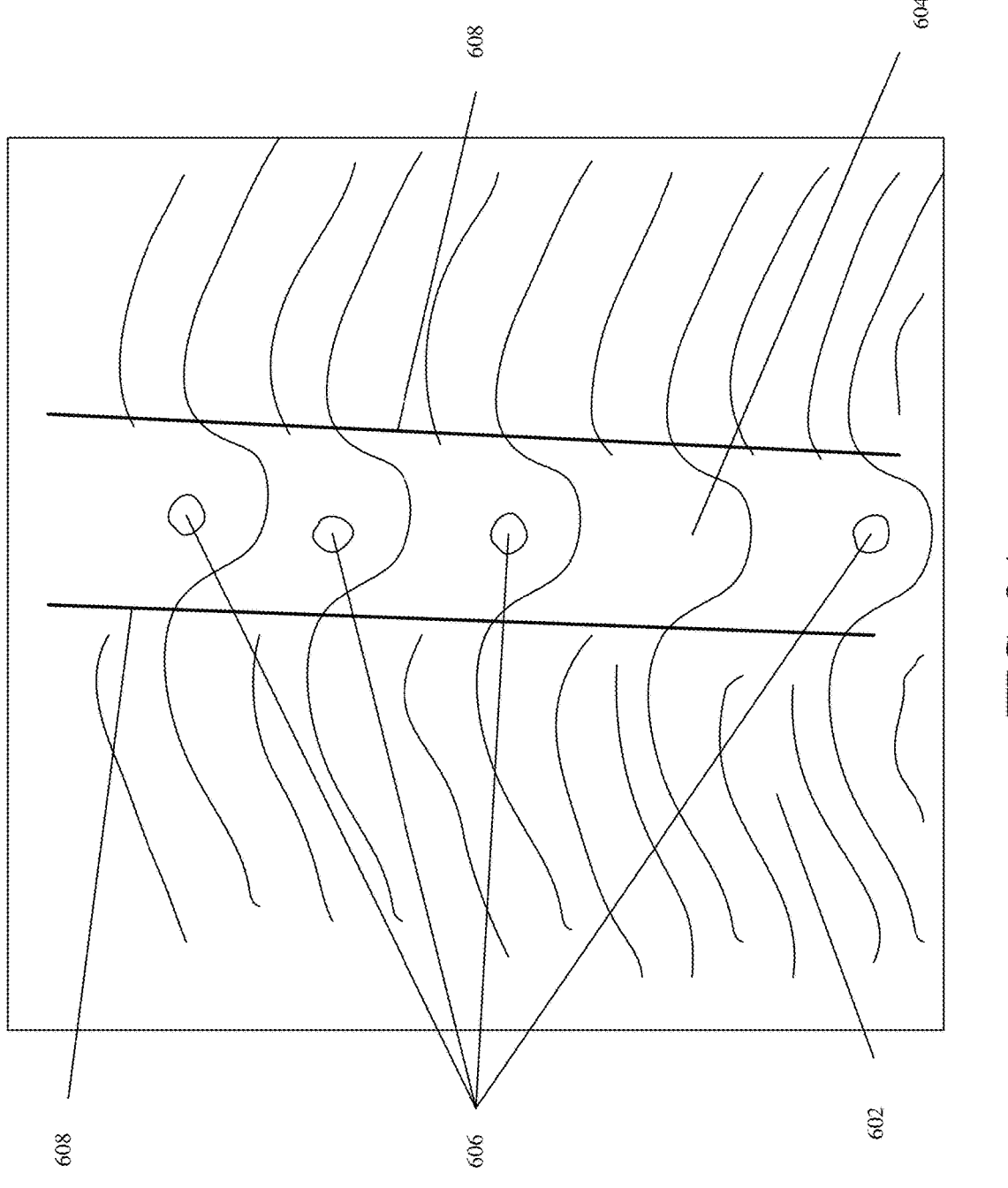
FIGS. 9A-9C are partial diagrammatic views showing example image processing of example images of a furrow.
Figure 9B:
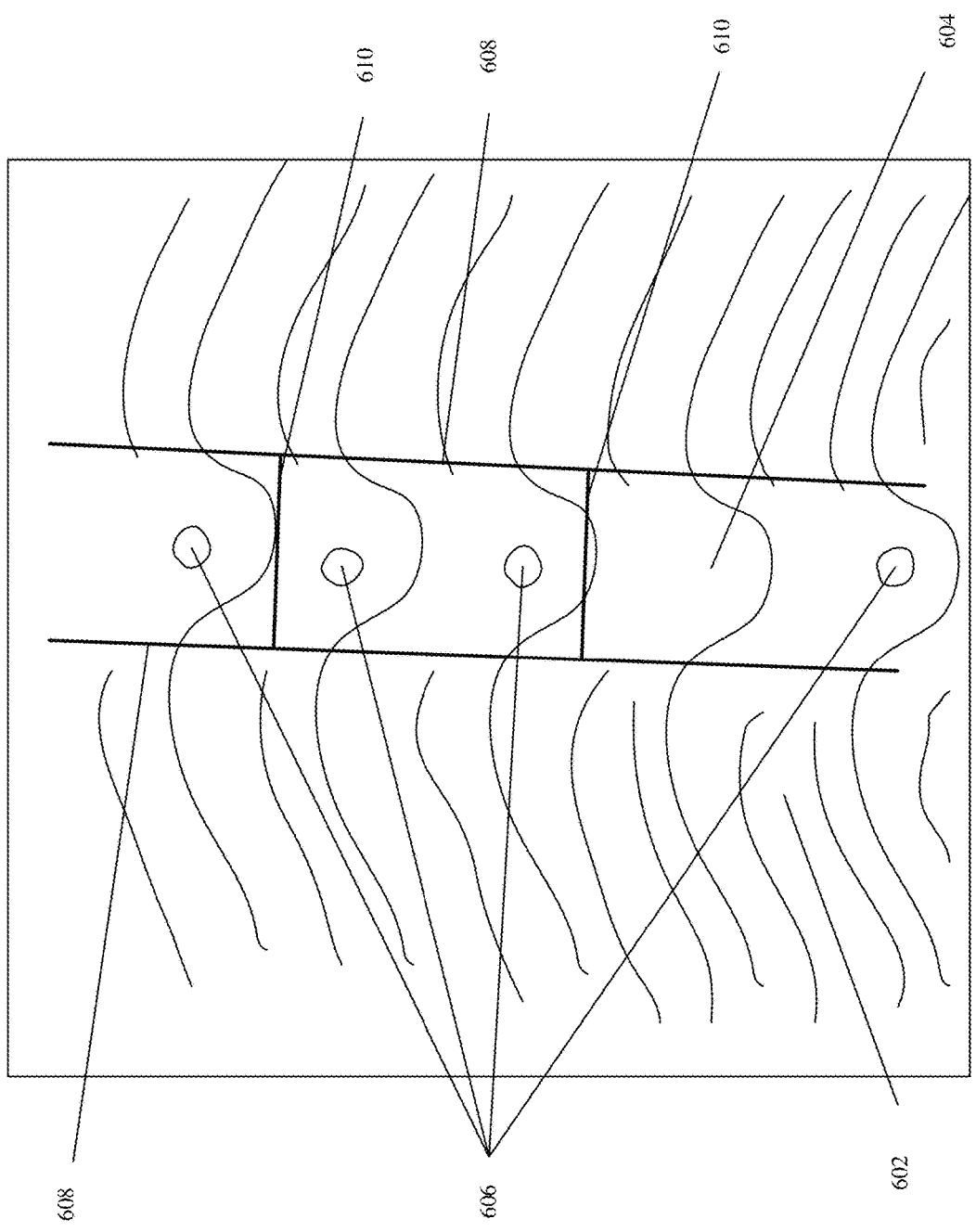
Figure 9C:
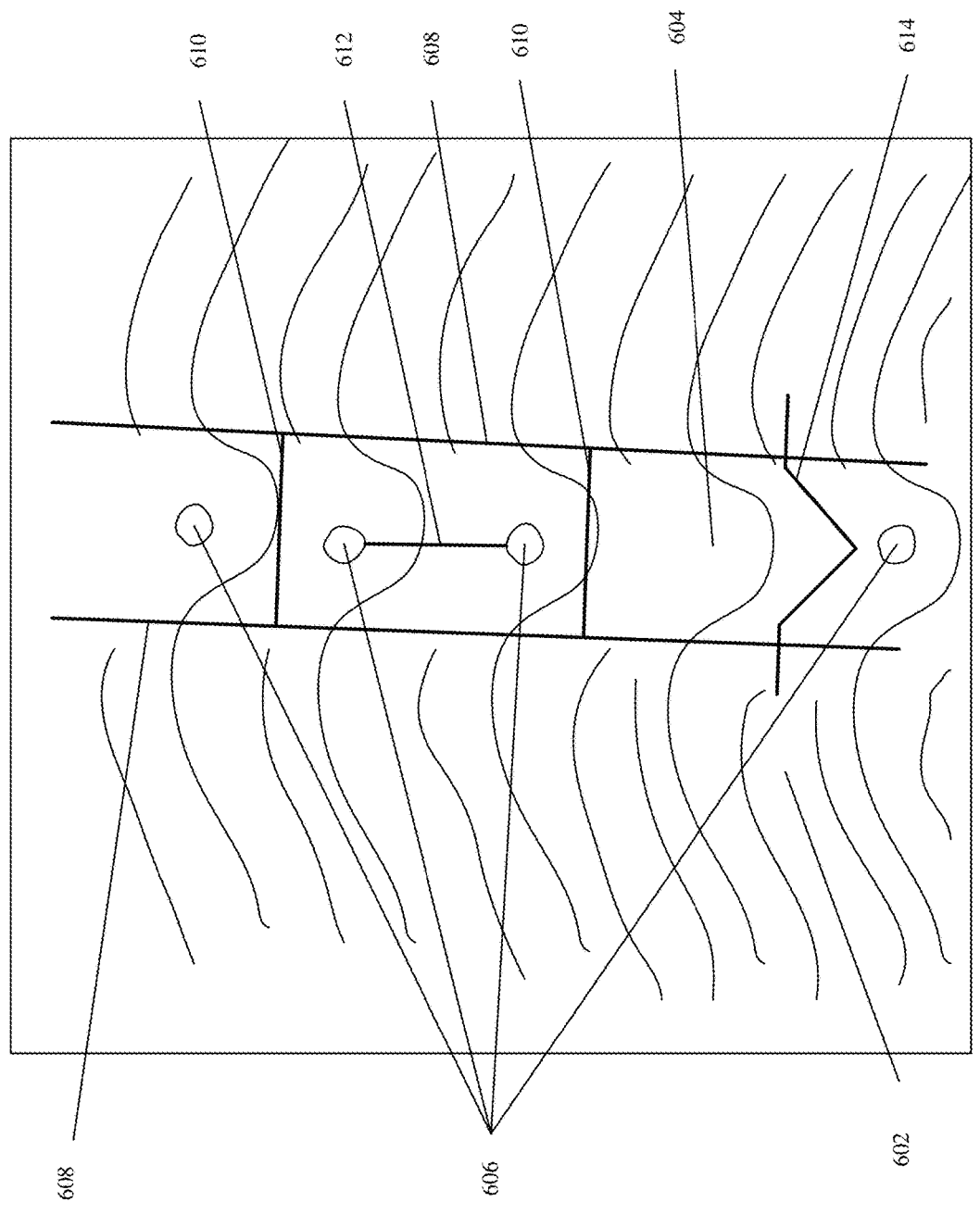

FIGS. 9A-9C are partial diagrammatic views showing examples of image processing by control system 208 on example images of furrows opened on an agricultural surface.

FIG. 9A is a partial diagrammatic view showing one example of control system 208 identifying a region of interest on an example image of a furrow. Image 600 includes agricultural surface 602, furrow 604, seeds 606 and region of interest 608. During image processing, control system 208 can identify a region of interest as defined by lines 608 in image 600 captured by furrow sensor system 130. In one example, region of interest 608 corresponds to furrow 604. In this way, control system 208 can extract values of characteristics that are relevant to furrow 604 and can filter out characteristics in the image that may not be relevant to the quality of furrow 604.

FIG. 9B is a partial diagrammatic view showing one example of control system 208 identifying sub-regions within region of interest 608. FIG. 9B is similar to FIG. 9A and thus similar items are numbered similarly. In addition to the features in FIG. 9A, image 600 includes sub-regions as defined by lines 610. During image processing, control system 208 can identify sub-regions 610 within region of interest 608. In this way, values of characteristics of each sub-region 610 can be extracted and compared across the entire region of interest 608 to determine whether there is uniformity of characteristics in furrow 604. As can be seen, the spacing of seeds 606 is not consistent across the entire furrow. This inconsistency can be evaluated and reflected in the resulting furrow quality metric. The same type of inconsistencies can be identified for residue presence, and various other characteristics and/or agronomic factors.

FIG. 9C is a partial diagrammatic view of a furrow 604 to illustrate one example of how control system 208 can extract values of individual characteristics from one example image of a furrow. FIG. 9C is similar to FIGS. 9A-B and thus similar items are numbered similarly. In addition to the features in FIGS. 9A-B, image 600 shows that the seed spacing between two seeds as represented by 612 and furrow dimension is represented by 614. As can be seen, control system 208 can process image 600 to extract values of individual characteristics. As illustrated, control system 208 can identify seed spacing values (e.g., values indicative of the linear distance between seeds) by analyzing the sensed furrow (e.g., by performing image processing on the image) to identify the distance 612 between adjacent seeds in the furrow. For example, control system 208 can perform image processing to extract a seed spacing value of 3 inches for a particular sub-region 610, and/or a seed spacing value of 4.6 inches as an average seed spacing across region of interest 608. Additionally, control system 208 can analyze the furrow image to identify furrow dimensional values 614 (e.g., furrow width, furrow depth, furrow shape, etc.). For example, control system 208 can extract a furrow depth of 6 inches for a particular sub-region 610, or a furrow depth of 5.7 inches as an average furrow depth across region of interest 608. These are examples only.

It is noted that the image processing and identified furrow characteristics and values thereof shown in FIGS. 9A-C are merely examples. Control system 208 can extract numerous values for a variety of characteristics and/or agronomic factors from sensor signals generated by sensor(s) 250 (e.g., from the image captured by furrow imaging system(s) 130). Such characteristics can include, but are not limited to, seed depth, furrow depth, soil color, soil moisture, soil composition, seed orientation, seed position, furrow shape, furrow width, seed location, seed count, seed location residue level, residue percentage, seed spacing, seed centering, substance (e.g., fertilizer) application, seed to soil contact, furrow sidewall characteristics (e.g., smearing), furrow compaction, quality of closing furrow (e.g., level of soil coverage of seeds), moisture depth, moisture line relative to seed, seed movement relative to ground, as well as a variety of other characteristics.

Additionally, control system 208 can perform or otherwise utilize a variety of image processing techniques, including, but not limited to, color modeling (e.g., RGB), edge detection, black/white analysis, machine learning, neural networks, pixel testing, pixel clustering, shape detection, as well as various other techniques.

The present discussion has mentioned processors and servers. In one embodiment, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It will also be noted that the information on map 107 can be output to the cloud.

Figure 10:
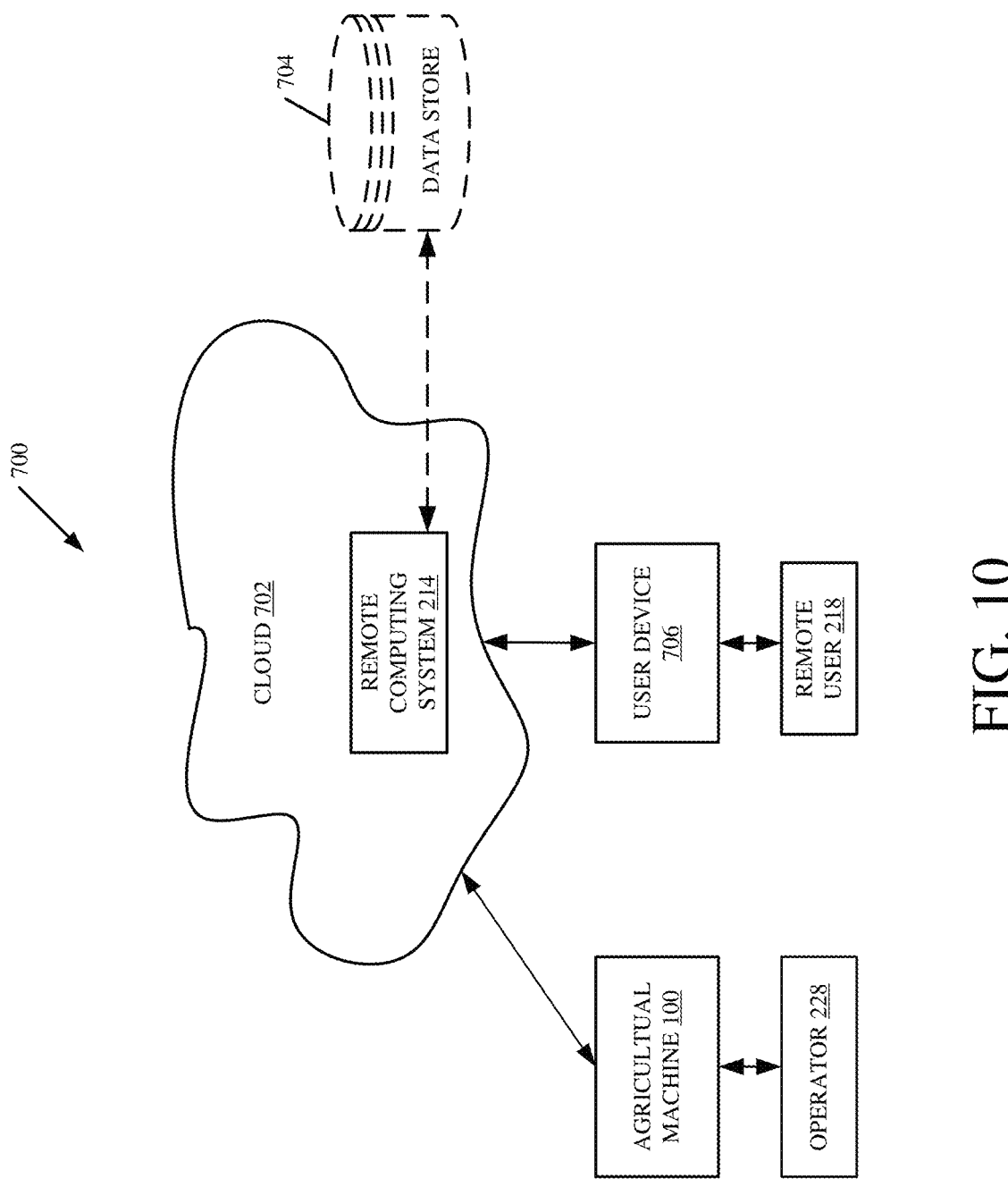
FIG. 10 is a block diagram showing the architecture illustrated in FIG. 5 deployed in a remote server architec- ture.

FIG. 10 is a block diagram of agricultural machine 100, shown in FIG. 5, except that it communicates with elements in a remote server architecture 700. In an example embodiment, remote server architecture 700 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 10, some items are similar to those shown in FIG. 5 and they are similarly numbered. FIG. 10 specifically shows that remote computing system 214 can be located at a remote server location 702. Therefore, agricultural machine 100 and operator 228 accesses those systems through remote server location 702.

FIG. 10 also depicts another embodiment of a remote server architecture. FIG. 5 shows that it is also contemplated that some elements of FIG. 5 are disposed at remote server location 702 while others are not. By way of example, data store 704, which can comprise a third-party system, can be disposed at a location separate from location 702 and accessed through the remote server at location 702. Regardless of where they are located, they can be accessed directly by agricultural machine 100 and/or operator 228, as well as by remote user 218 (via user device 706) through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the agricultural machine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send the information to the main network.

It will also be noted that the elements of FIG. 5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
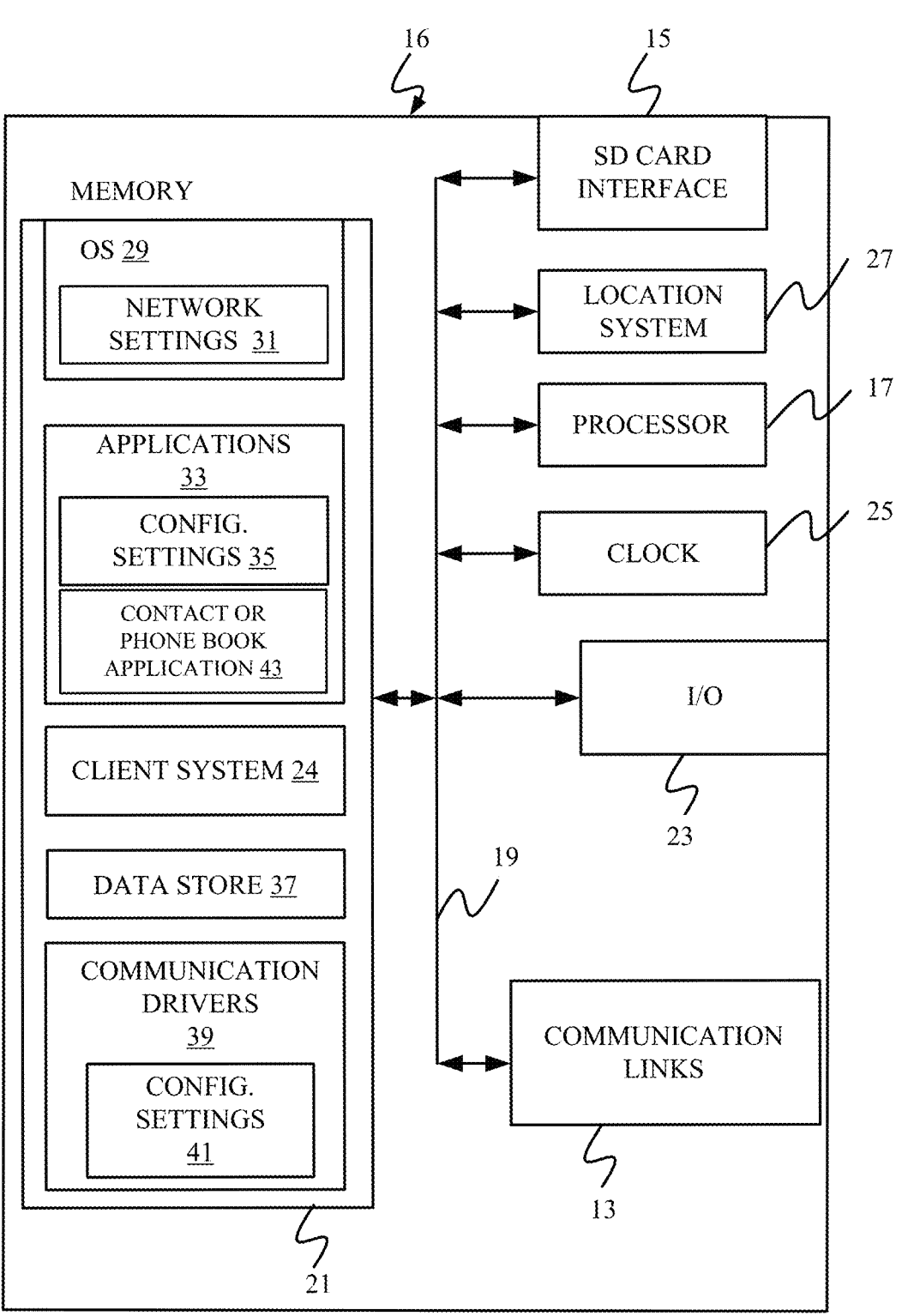
Figure 12:
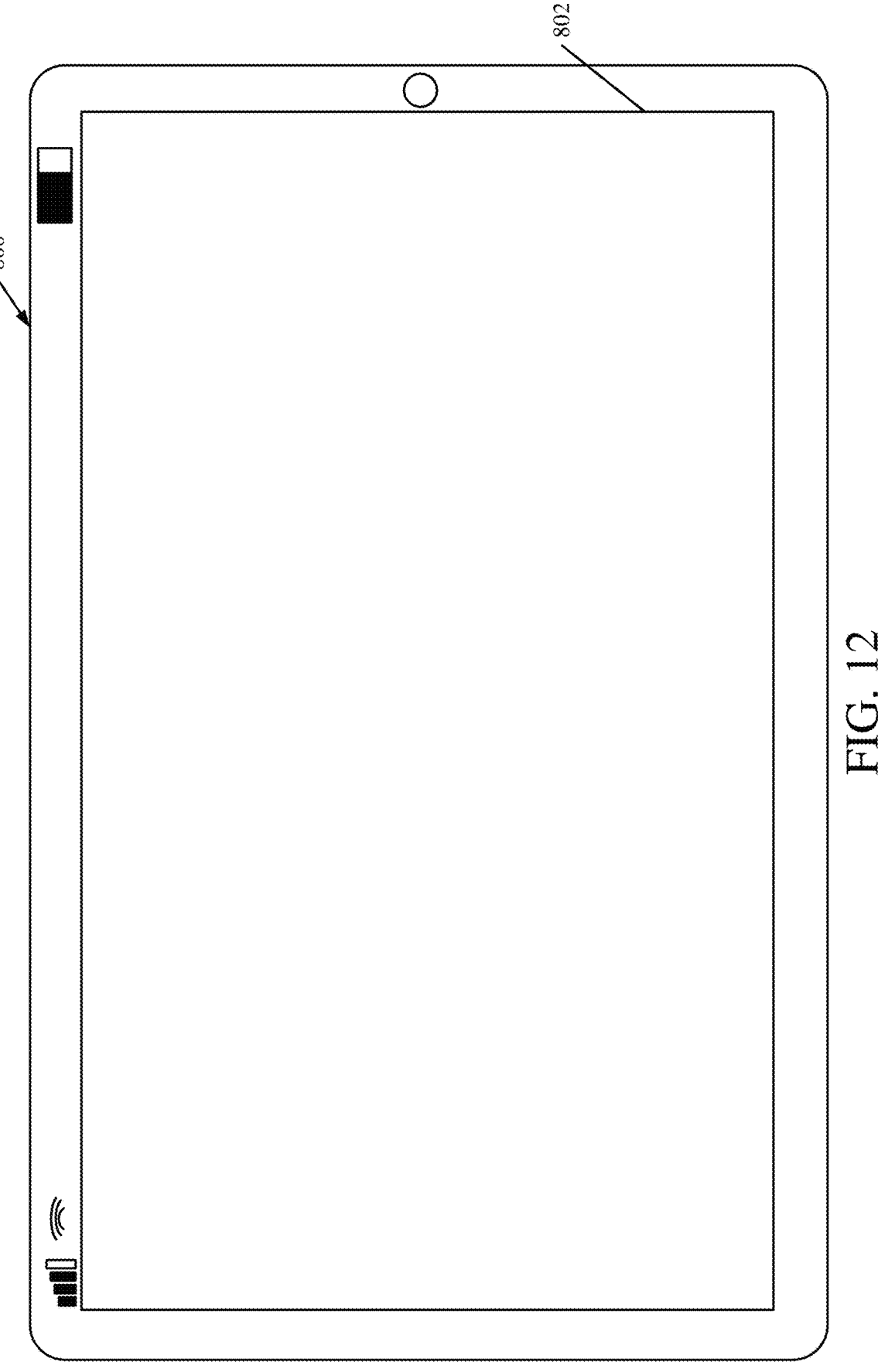
FIGS. 12-13 show examples of mobile devices that can be used in the architectures shown in the previous FIGS.
Figure 13:
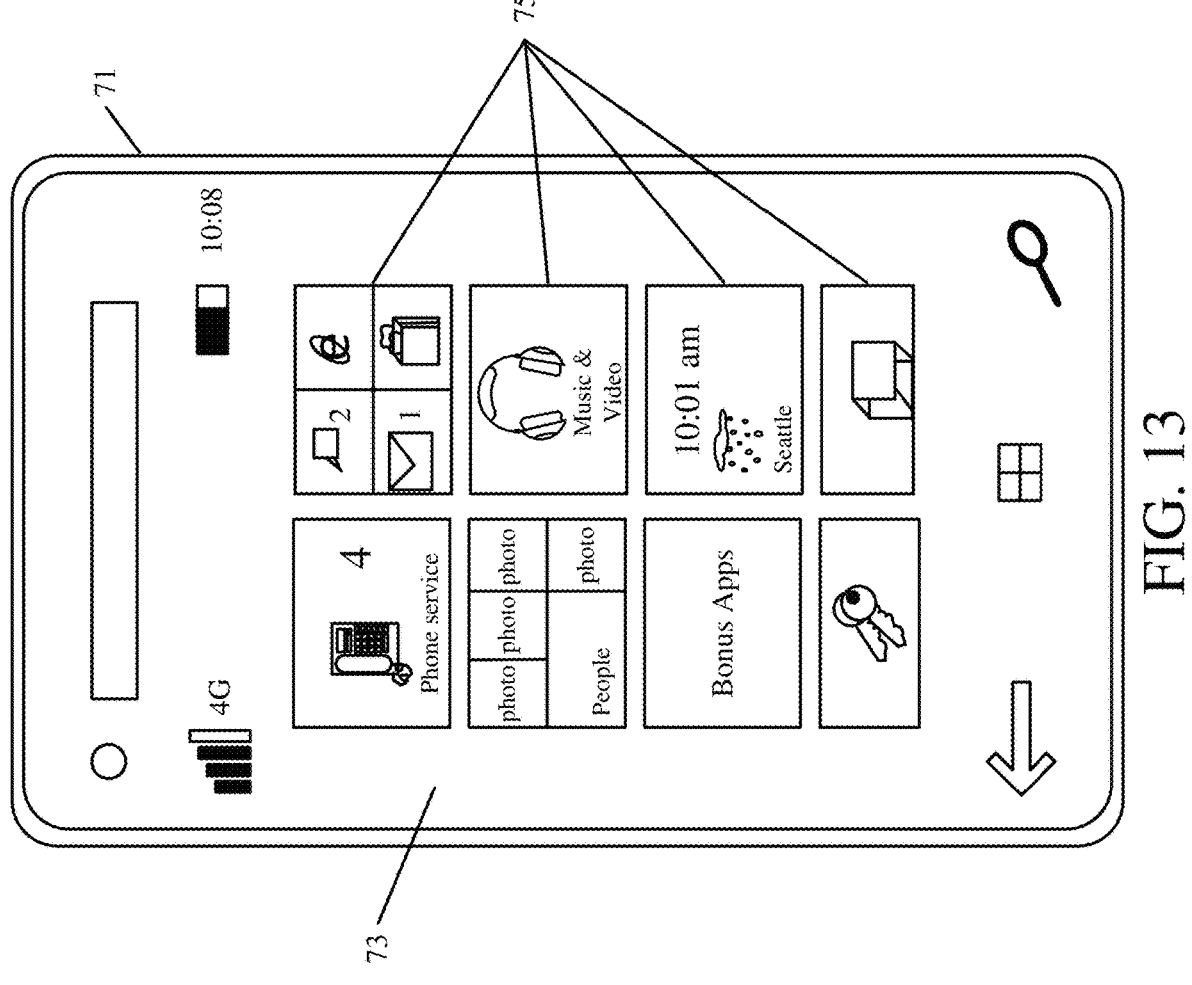

FIG. 11 is a simplified block diagram of one illustrative embodiment of a handheld or mobile computing device that can be used as a user's or client's handheld device 16, in which the present system (or parts of it) can be deployed. For instance, a mobile device can be deployed in the operator compartment of agricultural machine 100 for use in generating, processing, or displaying the stool width and position data. FIGS. 12-13 are examples of handheld or mobile devices.

FIG. 11 provides a general block diagram of the components of a client device 16 that can run some components shown in FIG. 5, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor(s)/server(s) 284 from FIG. 5) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one embodiment in which device 16 is a tablet computer 800. In FIG. 12, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 13 is similar to FIG. 12 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
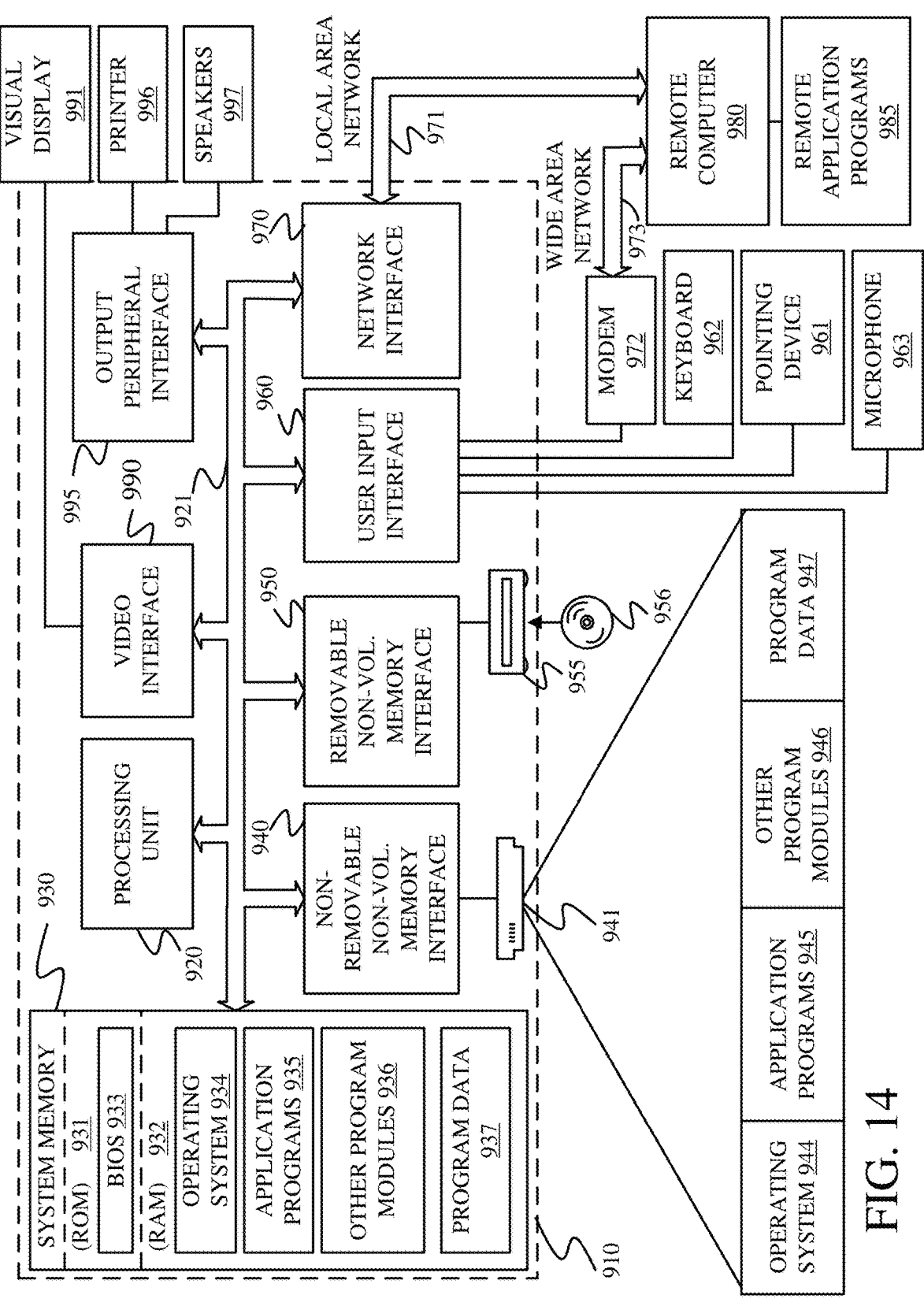
FIG. 14 is a block diagram showing one example of a computing environment that can be used in the architectures illustrated in previous FIGS.

FIG. 14 is one embodiment of a computing environment in which elements of FIG. 5, or parts of it, (for example) can be deployed. With reference to FIG. 14, an exemplary system for implementing some embodiments includes a general-purpose computing device in the form of a computer 910. Components of computer 910 may include, but are not limited to, a processing unit 920 (which can comprise processor(s)/server(s) 284), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 5 can be deployed in corresponding portions of FIG. 14.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 14 illustrates operating system 934, application programs 935, other program modules 936, and program data 937.

The computer 910 may also include other removable/non-removable volatile/nonvolatile computer storage media. By way of example only, FIG. 14 illustrates a hard disk drive 941 that reads from or writes to non-removable, nonvolatile magnetic media, a magnetic disk drive 951, nonvolatile magnetic disk 952, an optical disk drive 955, and nonvolatile optical disk 956. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 910. In FIG. 14, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 14 illustrates, for example, that remote application programs 985 can reside on remote computer 980.

It is noted while agricultural planting machines have been particularly discussed with respect to the examples described herein, other machines can also be implemented with said examples. Thus, the present disclosure is not limited to use of the systems and processes discussed with merely planting machines. They can be used with other machines as well, some of which are mentioned above.

Example 1 is a mobile agricultural machine comprising:

a row unit comprising:

a furrow opener mounted to the row unit and configured to engage a surface of ground over which the mobile agricultural machine travels to open a furrow in the ground;

a furrow closer mounted to the row unit behind the furrow opener relative to a direction of travel of the mobile agricultural machine and configured to engage the surface of the ground to close the furrow; and a furrow sensor system mounted to the row unit and configured to sense characteristics relative to the furrow opened by the furrow opener and generate a sensor signal indicative of the characteristics; and a control system configured to determine a furrow quality metric corresponding to the furrow sensed by the furrow sensor system based on the sensor signal and generate an action signal to control an action of the mobile agricultural machine based on the furrow quality metric.

Example 2 is the mobile agricultural machine of any or all previous examples and further comprising:

a user interface device; and wherein the action signal is configured to control the user interface device to surface a display indicative of the furrow quality metric.

Example 3 is the mobile agricultural machine of any or all previous examples, wherein the control system further comprises:

a map generator that maps the determined furrow quality metric to a corresponding geographic location on the agricultural surface based on a sensor signal, indicative of the location of the mobile agricultural machine when the furrow sensor system sensed the characteristics relative to the furrow opened by the furrow opener, generated by a geographic position sensor and generates a display on the user interface device of a map of the agricultural surface that includes an indication of the determined furrow quality metric at the corresponding geographic location.

Example 4 is the mobile agricultural machine of any or all previous examples, wherein the furrow sensor system comprises:

an imaging system that captures an image of the furrow opened by the furrow opener, and generates the sensor signal as being indicative of the image.

Example 5 is the mobile agricultural machine of any or all previous examples, wherein the control system comprises:

a furrow quality determination system configured to process the image of the furrow captured by the imaging system to extract values corresponding to the characteristics of the furrow indicated by the image of the furrow.

Example 6 is the mobile agricultural machine of any or all previous examples, wherein the furrow quality determination system is further configured to assign scaled values to the extracted values corresponding to the characteristics indicated by the image of the furrow captured by the imaging system, the scaled values indicating a quality of the corresponding characteristics.

Example 7 is the mobile agricultural machine of any or all previous examples, wherein the furrow quality determination system is further configured to aggregate the scaled values to generate the furrow quality metric, the furrow quality metric indicating an overall quality of the furrow captured in the image.

Example 8 is the mobile agricultural machine of any or all previous examples, wherein the action signal is configured to adjust the downforce exerted on the row unit by a downforce generation subsystem.

Example 9 is the mobile agricultural machine of any or all previous examples, wherein the action signal is configured to adjust a position of a gauge wheel to adjust the furrow opener's depth of engagement with the surface of the ground.

Example 10 is the mobile agricultural machine of any or all previous examples, wherein the control system further comprises:

a change identifier that compares the determined furrow quality metric to a previously determined furrow quality metric to determine if a change in furrow quality has occurred, and, if a change has occurred, generates an action signal to control an action of the mobile agricultural machine.

Example 11 is a method of controlling a mobile agricultural machine comprising:

sensing, with a furrow sensing system, characteristics of a furrow, opened by a furrow opener mounted to a row unit on the mobile agricultural machine;

generating a sensor signal indicative of the sensed characteristics;

determining a furrow quality metric based on the sensor signal indicative of the characteristics of the furrow generated by the furrow sensing system; and generating an action signal to control an action of the mobile agricultural machine based on the determined furrow quality metric.

Example 12 is a method of any or all previous examples, wherein generating an action signal to control an action of the mobile agricultural machine comprises:

controlling a user interface display on the mobile agricultural machine to surface an indication of the determined furrow quality metric.

Example 13 is a method of any or all previous examples, wherein controlling a user interface display on the mobile agricultural machine to surface an indication of the determined furrow quality metric comprises:

generating a map having an indicator that indicates the furrow quality metric at a corresponding geographic location on the agricultural surface.

Example 14 is the method of any or all previous examples, wherein sensing characteristics of the furrow opened by the mobile agricultural machine comprises:

capturing an image of the furrow.

Example 15 is the method of any or all previous examples, wherein determining a furrow quality metric further comprises:

processing the captured image to extract values corresponding to the characteristics of the furrow indicated by the captured image of the furrow.

Example 16 is the method of any or all previous examples, wherein determining a furrow quality metric further comprises:

assigning scaled values to the extracted values corresponding to the characteristics indicated by the captured image of the furrow, wherein the scaled values indicate a quality of the corresponding characteristics.

Example 17 is the method of any or all previous examples, wherein determining a furrow quality metric further comprises:

aggregating the scaled values to generate the furrow quality metric as being indicative of an overall quality of the furrow captured in the image.

Example 18 is the method of any or all previous examples, wherein generating an action signal to control an operation of the mobile agricultural machine comprises:

controlling an actuator to adjust a position of a gauge wheel to adjust a depth of engagement of the furrow opener with the agricultural surface.

Example 19 is the method of any or all previous examples, wherein generating an action signal to control an operation of the mobile agricultural machine comprises:

controlling a downforce generation subsystem on the mobile agricultural machine to adjust the downforce exerted by the downforce generation subsystem on the row unit.

Example 20 is a method of controlling a mobile agricultural machine comprising:

sensing, with a furrow sensing system, characteristics of a furrow, opened by a furrow opener mounted to a row unit on the mobile agricultural machine;

generating a sensor signal indicative of the sensed characteristics;

determining a furrow quality metric based on the sensor signal indicative of the characteristics of the furrow generated by the furrow sensing system;

comparing the determined furrow quality metric to a previously determined furrow quality metric, the previously determined furrow quality metric indicative of a quality of a furrow previously opened by the mobile agricultural machine;

determining, based on the comparison of the determined furrow quality metric to the previously determined furrow quality metric, if a change in furrow quality has occurred; and if a change in furrow quality has occurred, generating an action signal to control an action of the mobile agricultural machine.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural machine comprising:
   a row unit comprising:
      a furrow opener mounted to the row unit and configured to engage a surface of ground over which the mobile agricultural machine travels to open a furrow in the ground;
      a furrow closer mounted to the row unit behind the furrow opener relative to a direction of travel of the mobile agricultural machine and configured to engage the surface of the ground to close the furrow; and
      a furrow sensor system mounted to the row unit, the furrow sensor system comprising an imaging system configured to travel outside of the furrow and capture an image of the furrow, while the furrow is open, the image indicative of a plurality of different characteristics relative to the furrow; and
   a control system configured to determine a singular furrow quality metric indicative of an overall quality of the furrow based on the plurality of different characteristics detected by the furrow sensor system and to generate an action signal to control an action of the mobile agricultural machine based on the singular furrow quality metric.

2. The mobile agricultural machine of claim 1 and further comprising:
   a user interface device; and
   wherein the action signal is configured to control the user interface device to generate a display indicative of the singular furrow quality metric.

3. The mobile agricultural machine of claim 2, wherein the control system further comprises:

a map generator configured to:

map the singular furrow quality metric to a corresponding geographic location on the surface based on a location sensor signal generated by a geographic position sensor, the location sensor signal indicative of a location of the mobile agricultural machine when the furrow sensor system sensed the plurality of different characteristics relative to the furrow; and wherein the action signal is configured to control the user interface device to generate, as the display indicative of the singular furrow quality metric, a display indicative of the mapped singular furrow quality metric.

4. The mobile agricultural machine of claim 1, wherein the control system comprises:

a furrow quality determination system configured to process the image of the furrow captured by the imaging system to extract a respective value corresponding to each characteristic of the plurality of different characteristics of the furrow indicated by the image of the furrow.

5. The mobile agricultural machine of claim 4, wherein the furrow quality determination system is further configured to assign a respective scaled value to each respective value extracted from the image of the furrow, each respective scaled value indicating a quality of the corresponding characteristic.

6. The mobile agricultural machine of claim 5, wherein the furrow quality determination system is further configured to aggregate the scaled values to generate the singular furrow quality metric.

7. The mobile agricultural machine of claim 1, wherein the control system further comprises:

a change identifier configured to:

compare the singular furrow quality metric to a previously determined furrow quality metric; and determine, based on the comparison, a change in furrow quality has occurred, wherein the control system generates the action signal to control the action of the mobile agricultural machine based on the determination that the change in furrow quality has occurred.

8. A method of controlling a mobile agricultural machine comprising:

sensing a plurality of different characteristics of a furrow opened by a furrow opener mounted to a row unit on the mobile agricultural machine, with a furrow sensing system while the furrow is open and while the furrow sensing system travels outside of the furrow, wherein sensing comprises capturing an image of the furrow, opened by the furrow opener mounted to the row unit on the mobile agricultural machine, while the furrow is open, the image indicative of the plurality of different characteristic of the furrow:

determining a singular furrow quality metric, indicative of an overall quality of the furrow, based on the plurality of different characteristics of the furrow sensed by the furrow sensing system; and generating an action signal to control an action of the mobile agricultural machine based on the singular furrow quality metric.

9. The method of claim 8, wherein generating the action signal to control an action of the mobile agricultural machine comprises:

generating the action signal to control a user interface display on the mobile agricultural machine to generate an indication of the singular furrow quality metric.

10. The method of claim 9, wherein controlling the user interface display on the mobile agricultural machine to generate an indication of the singular furrow quality metric comprises:

generating a map having an indicator that indicates the singular furrow quality metric at a corresponding geographic location on an agricultural surface; and controlling the user interface display on the mobile agricultural machine to generate, as the indication of the singular furrow quality metric, a display of the map.

11. The method of claim 8, wherein determining the furrow quality metric further comprises:

processing the image of the furrow to extract a respective value corresponding to each characteristic of the plurality of different characteristics of the furrow indicated by the image of the furrow.

12. The method of claim 11, wherein determining the furrow quality metric further comprises:

assigning a respective scaled value to each respective value extracted from the image of the furrow, wherein each respective scaled value indicating a quality of the corresponding characteristic.

13. The method of claim 12, wherein determining the furrow quality metric further comprises:

aggregating the scaled values to generate the singular furrow quality metric.

14. A mobile agricultural machine comprising:

a furrow opener configured to engage a surface of ground over which the mobile agricultural machine travels to open a furrow in the ground;

a furrow sensor system comprising an imaging system configured to capture an image of the furrow opened by the furrow opener, while the furrow is open, the image indicative of a plurality of different characteristics relative to the furrow opened by the furrow opener and generate a sensor signal indicative of the plurality of different characteristics; and a control system configured to determine a singular furrow quality metric, indicative of an overall quality of the furrow, based on the sensor signal indicative of the plurality of different characteristics relative to the furrow and to generate, based on the singular furrow quality metric, an action signal to control an action of the mobile agricultural machine.

15. The mobile agricultural machine of claim 14, wherein the control system comprises:

a furrow quality determination system configured to process the image of the furrow captured by the imaging system to extract a respective value corresponding to each characteristic of the plurality of different characteristics relative to the furrow indicated by the image of the furrow captured by the imaging system.

16. The mobile agricultural machine of claim 15, wherein the furrow quality determination system is further configured to assign a respective scaled value to each respective value extracted from the image of the furrow, each sealed value indicating a quality of the corresponding characteristic.

17. The mobile agricultural machine of claim 16, wherein the furrow quality determination system is further configured to aggregate the scaled values to generate the singular furrow quality metric.

18. A method of controlling a mobile agricultural machine comprising:

sensing, with a furrow sensing system, a plurality of different characteristics of a furrow, opened by a furrow opener on the mobile agricultural machine, while the furrow is open, wherein sensing the plurality of different characteristics of the furrow opened by the mobile agricultural machine comprises:

capturing an image of the furrow opened by the mobile agricultural machine while the furrow is open, the image of the furrow indicative of the plurality of different characteristics of the furrow;

generating, with the furrow sensing system, a sensor signal indicative of the plurality of different characteristics sensed by the furrow sensing system;

determining a singular furrow quality metric, indicative of an overall quality of the furrow, based on the sensor signal indicative of the plurality of different characteristics of the furrow; and generating an action signal to control the mobile agricultural machine based on the singular furrow quality metric.

19. The method of claim 18, wherein generating the action signal to control the mobile agricultural machine based on the singular furrow quality metric comprises:

generating the action signal to control a user interface display on the mobile agricultural machine to generate an indication of the singular furrow quality metric.

20. The method of claim 18, wherein determining the furrow quality metric further comprises:

processing the image of the furrow to extract a respective value corresponding to each characteristic of the plurality of different characteristics of the furrow indicated by the image of the furrow.

21. The method of claim 20, wherein determining the furrow quality metric further comprises:

assigning a respective scaled value to each respective value, extracted from the image of the furrow, wherein each scaled value indicates a quality of the corresponding characteristic.

22. The method of claim 21, wherein determining the furrow quality metric further comprises:

aggregating the scaled values to generate the singular furrow quality metric.

23. The mobile agricultural machine of claim 14, wherein the action signal is configured to control a downforce generation subsystem, of the mobile agricultural machine, to control a downforce exerted by the downforce generation subsystem.

24. The mobile agricultural machine of claim 14, wherein the action signal is configured to control an actuator, of the mobile agricultural machine, to control a depth of engagement of the furrow opener with the ground.

25. The method of claim 18, wherein generating the action signal to control the mobile agricultural machine based on the singular furrow quality metric comprises:

generating the action signal to control a controllable subsystem of the mobile agricultural machine based on the furrow quality metric.

26. The mobile agricultural machine of claim 1, wherein the control system is configured to determine the singular furrow quality metric, indicative of the overall quality of the furrow, based on all characteristics of the plurality of different characteristics detected by the furrow sensor system.

27. The method of claim 8, wherein determining the singular furrow quality metric comprises determining the singular furrow quality metric, indicative of the overall quality of the furrow, based on all of the characteristics of the plurality of different characteristics of the furrow sensed by the furrow sensing system.

\* \* \* \* \*